United States Patent
Matsuda et al.

(10) Patent No.: US 9,399,945 B2
(45) Date of Patent: Jul. 26, 2016

(54) CONTROL DEVICE OF INTERNAL-COMBUSTION ENGINE

(75) Inventors: Kazuhisa Matsuda, Susono (JP); Kouji Morita, Mishima (JP); Takahiro Tsukagoshi, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 71 days.

(21) Appl. No.: 14/001,610

(22) PCT Filed: Aug. 29, 2011

(86) PCT No.: PCT/JP2011/069452
§ 371 (c)(1),
(2), (4) Date: Aug. 26, 2013

(87) PCT Pub. No.: WO2013/030924
PCT Pub. Date: Mar. 7, 2013

(65) Prior Publication Data
US 2014/0158086 A1    Jun. 12, 2014

(51) Int. Cl.
*F02B 17/00* (2006.01)
*F02D 13/02* (2006.01)
(Continued)

(52) U.S. Cl.
CPC .......... *F02B 17/005* (2013.01); *F02D 13/0207* (2013.01); *F02D 13/0219* (2013.01); *F02D 19/084* (2013.01); *F02D 19/088* (2013.01);
(Continued)

(58) Field of Classification Search
CPC ........ F02B 17/00; F02B 17/005; F02D 41/00; F02D 41/405; F02D 41/0025; F02D 41/064; F02D 41/006; F02D 41/025; F02D 19/084; F02D 19/088; F02D 2041/001; F02D 2200/0611; Y02T 10/36; Y02T 10/44; Y02T 10/26; Y02T 10/47

See application file for complete search history.

(56) References Cited

U.S. PATENT DOCUMENTS 6,502,541 B2 *  1/2003  Abo ...................... F02B 17/005
                                                    123/295
8,078,387 B2 * 12/2011  Kumano ............. F02D 13/0265
                                                    123/299

FOREIGN PATENT DOCUMENTS

JP      03-145557 A      6/1991
JP      05-001574 A      1/1993
(Continued)

OTHER PUBLICATIONS

International Search Report for PCT/JP2011/069452, dated Sep. 20, 2011.

*Primary Examiner* — Hieu T Vo
(74) *Attorney, Agent, or Firm* — Sughrue Mion, PLLC

(57) ABSTRACT

When alcohol-blended fuel is supplied to an internal-combustion engine, the magnitude of alcohol concentration (more particularly, ethanol concentration Cetha) is judged (Step 1005) and, based on this judgment, the magnitude of operational status temperature (more particularly, cooling water temperature THW) is judged (Step 1015). Then, when the alcohol concentration is large and the operational status temperature is low, generation of an intermediate product which is an oxide of alcohol contained in the alcohol-blended fuel in an unburnt state after main injection and alcohol contained in the alcohol-blended fuel in an unburnt state after post injection (more particularly, aldehyde) is promoted, and the generated intermediate product is trapped in an intake passage by making an intake valve into an opened state in an exhaust stroke of the internal-combustion engine (Step 1055).

8 Claims, 9 Drawing Sheets

(51) Int. Cl.
*F02D 19/08* (2006.01)
*F02D 41/02* (2006.01)
*F02D 41/40* (2006.01)
*F02D 35/02* (2006.01)
*F02D 41/00* (2006.01)
*F02D 41/06* (2006.01)
*F02D 41/30* (2006.01)
*F02D 19/06* (2006.01)

(52) U.S. Cl.
CPC .............. *F02D 35/02* (2013.01); *F02D 41/006* (2013.01); *F02D 41/0025* (2013.01); *F02D 41/025* (2013.01); *F02D 41/064* (2013.01); *F02D 41/3094* (2013.01); *F02D 41/405* (2013.01); *F02D 19/0689* (2013.01); *F02D 19/0692* (2013.01); *F02D 2041/001* (2013.01); *F02D 2200/0611* (2013.01); *Y02T 10/18* (2013.01); *Y02T 10/26* (2013.01); *Y02T 10/36* (2013.01); *Y02T 10/44* (2013.01); *Y02T 10/47* (2013.01)

(56) References Cited

FOREIGN PATENT DOCUMENTS

| | | |
|---|---|---|
| JP | 2009-062940 A | 3/2009 |
| JP | 2009-264223 A | 11/2009 |
| JP | 2010-065568 A | 3/2010 |
| JP | 2010-185300 A | 8/2010 |
| JP | 2010-222978 A | 10/2010 |

* cited by examiner

Upper Stream Side Air/Fuel Ratio abyfs

Lower Stream Side Air/Fuel Ratio afdown

CONTROL DEVICE OF INTERNAL-COMBUSTION ENGINE

CROSS REFERENCE TO RELATED APPLICATIONS

This application is a National Stage of International Application No. PCT/JP2011/069452 filed Aug. 29, 2011, the contents of all of which are incorporated herein by reference in their entirety.

TECHNICAL FIELD

The present invention relates to a control device of an internal-combustion engine which controls an internal-combustion engine. Hereinafter, an internal-combustion engine may be simply referred to as an "engine".

BACKGROUND ART

Conventionally, a control device of an internal-combustion engine which carries out feedback control of the air/fuel ratio of the air-fuel mixture supplied to an engine (hereinafter, may be simply referred to as an "air/fuel ratio of an engine") based on each output value of an upper stream side air/fuel ratio sensor and a lower stream side air/fuel ratio sensor disposed on the upper stream side and the lower stream side, respectively, from a three-way catalyst (hereinafter, may be simply referred to as a "catalyst") in an exhaust passage of an internal-combustion engine is known widely. In such a control device, the upper stream side air/fuel ratio sensor and the lower stream side air/fuel ratio sensor detect the air/fuel ratio of exhaust gas which is discharged from each cylinder of the internal-combustion engine and passes through an exhaust passage (hereinafter, referred to as a "mixed exhaust gas"), and the amount of air/fuel ratio feedbacks is computed using respective air/fuel ratios which each of these sensors detected. Then, by adjusting the quantities of fuel respectively injected to plural cylinders based on the amount of air/fuel ratio feedbacks, feedback control is carried out so that the air/fuel ratio of an engine may correspond to a target air/fuel ratio.

Moreover, in recent years, alcohol, such as ethanol, may be contained in gasoline supplied to an engine as fuel. For example, as for ethanol-containing gasoline fuel used for what is called FFV (Flexible Fuel Vehicle), "E3" in which ethanol concentration is 3%, "E85" in which the concentration is 85%, "E100" which is 100% ethanol fuel, etc. are mainly known, and thus ethanol concentration varies widely. In addition, when alcohol is contained in gasoline like this, such composite fuel of gasoline and alcohol will be referred to as "alcohol-blended fuel" or simply "fuel" hereinafter.

Regarding a control device of an internal-combustion engine which can use such alcohol-blended fuel, for example, the following patent documents 1 (PTL 1) discloses a control device of a flex-fuel internal-combustion engine which changes valve characteristic of an intake valve so that the higher its alcohol concentration is, the faster the flow velocity of the fuel which flows into a combustion chamber through the intake valve by a variable valve actuation mechanism. This conventional control device of a flex-fuel internal-combustion engine is configured so as to shorten the time period during which the fuel contacts the intake valve by increasing the flow velocity of the fuel which flows into the combustion chamber through the intake valve and suppress the evaporation of the fuel due to the heat from the intake valve. Thereby, it is configured so as to inhibit a detergent ingredient added to alcohol-blended fuel from precipitating and depositing on the intake valve.

Moreover, regarding a control device of an internal-combustion engine which can use such alcohol-blended fuel, for example, the following patent documents 2 (PTL 2) discloses a control device of an internal-combustion engine which can start up the engine early even if alcohol-blended fuel which is hard to microatomize under low-temperature environment. This conventional control device of a flex-fuel internal-combustion engine is configured so as to be applicable to an internal-combustion engine equipped with a variable valve timing control device, and it is configured so as to determine the timings for opening and closing an intake valve and/or an exhaust valve based on the alcohol concentration contained in the fuel and microatomize the fuel by gas blown back to an intake passage.

By the way, in an internal-combustion engine which can use alcohol-blended fuel, an intermediate product, such as formaldehyde, may be detected as a detrimental constituent when burning. For this reason, for example, the following patent documents 3 (PTL 3) discloses a valve timing control device of an engine which performs discharge control of formaldehyde accompanying combustion of alcohol-blended fuel by change of valve timing. This conventional control device comprises a valve timing variable mechanism which can change the timings for opening and closing at least one of an intake valve and an exhaust valve, and is configured so as to prolong an overlap period so that combustion temperature may become higher depending on the increase of the detected alcohol concentration in the fuel. Moreover, for example, the following patent documents 4 (PTL 4) discloses a re-burning control device of an engine which suppresses discharge of formaldehyde etc. accompanying combustion of alcohol-blended fuel. This conventional control device is configured so as to detect the operation state of the engine, inhale the burnt gas which was burned in other cylinders depending on the partial load of the engine, and completely burn this inhaled burnt gas.

CITATION LIST

Patent Literature

[PTL 1] Japanese Patent Application Laid-Open (kokai) No. 2010-065568

[PTL 2] Japanese Patent Application Laid-Open (kokai) No. 2010-185300

[PTL 3] Japanese Patent Application Laid-Open (kokai) No. H05-001574

[PTL 4] Japanese Patent Application Laid-Open (kokai) No. H03-145557

SUMMARY OF INVENTION

By the way, since the latent heat for evaporation of alcohol in alcohol-blended fuel is high, especially on low-temperature starting, evaporation thereof is not promoted and unburnt gas containing aldehyde which is an unstable intermediate product due to its chemical structure, etc. are likely to generate. On the other hand, since an intermediate product thus generated is un stable due to its chemical structure, it has the characteristic that it is likely to be oxidized, i.e., it is easily burned. For this reason, it is thought that, especially at low-temperature condition where good start-up performance of an internal-combustion engine, in other words, good combustion quality in an internal-combustion engine, cannot be attained, it becomes possible to improve combustion quality in an internal-combustion engine by burning the intermediate product thus generated.

The present invention has been created in order to solve the above-mentioned subject and has an objective to provide a control device of an internal-combustion engine which can produce an intermediate product from unburnt alcohol and use the intermediate product thus produced for improving combustion quality in the internal-combustion engine when alcohol-blended fuel is supplied to the engine.

A control device of an internal-combustion engine according to the present invention for attaining such an objective (the present control device) is applied to an internal-combustion engine equipped with a direct injection means which directly injects fuel containing at least gasoline into a combustion chamber of the internal-combustion engine and a variable valve actuation means to continuously change the timings of opening and closing and the valve opening position of an intake valve disposed in an intake passage through which the air inhaled into the above-mentioned combustion chamber. Namely, the present control device is applied to an internal-combustion engine to which alcohol-blended fuel comprising the mixture of gasoline and alcohol may be supplied.

One of the features of a control device of an internal-combustion engine according to the present invention is in that the above-mentioned direct injection means injects the above-mentioned fuel in order to rise the temperature of a catalyst disposed in an exhaust passage through which exhaust gas discharged from the above-mentioned combustion chamber passes and thereafter the above-mentioned variable valve actuation means keeps the above-mentioned intake valve opened during a predetermined period.

In accordance with the above, the direct injection means injects the fuel in order to rise the temperature of the catalyst (what is called, post injection) and thereby a large quantity of an intermediate product can be generated not only from unburnt fuel (alcohol) existing due to an injection of the fuel before post injection (what is called, main injection) but also from unburnt fuel (alcohol) due to post injection, and the variable valve actuation means keeps the intake valve opened during the predetermined period and thereby the intermediate product thus generated can be collected and stored in the intake passage.

In this case, it is preferable that the control device of an internal-combustion engine is further equipped with an intermediate product generation presumption means to presume the quantity of an intermediate product produced from the unburnt fuel in the above-mentioned fuel supplied into the above-mentioned combustion chamber and the above-mentioned variable valve actuation means keeps the above-mentioned intake valve opened at a large valve opening position during the above-mentioned predetermined period when the quantity of generation of the above-mentioned intermediate product presumed by the above-mentioned intermediate product generation presumption means is large, while it keeps the above-mentioned intake valve opened at a small valve opening position during the above-mentioned predetermined period when the presumed quantity of generation of the above-mentioned intermediate product is small. Then, in this case, it is preferable that the above-mentioned intermediate product produced from the above-mentioned unburnt fuel is collected and stored in the above-mentioned intake passage to be inhaled into the above-mentioned combustion chamber in the next admission stroke in the above-mentioned internal-combustion engine. Moreover, it is preferable that the above-mentioned intermediate product is produced, for example, with advance of oxidation reaction of the above-mentioned unburnt fuel. Furthermore, it is preferable that the above-mentioned predetermined period is, at least, a period set up within an exhaust stroke in the above-mentioned internal-combustion engine.

In accordance with these, an intermediate product with excellent flammability (specifically, aldehyde generated with advance of oxidation reaction of alcohol, etc.) can be generated and this intermediate product can be blown back to an intake passage at least when the internal-combustion engine is in exhaust stroke, and thereby this intermediate product can be efficiently collected and stored. Specifically, when it is presumed that there is a large quantity of generation of the intermediate product, the intermediate product can be efficiently collected and stored by enlarging the valve opening position (valve lift) of the intake valve and reducing the flow resistance thereof into the intake passage from the combustion chamber (cylinder) of the internal-combustion engine so that the intermediate product generated can easily go into the intake passage. On the other hand, when it is presumed that there is a small quantity of generation of the intermediate product, the intermediate product can be efficiently collected and stored by making small the valve opening position (valve lift) of the intake valve and enlarging the flow velocity thereof from the combustion chamber (cylinder) of the internal-combustion engine into the intake passage so that the intermediate product can go into the intake passage certainly even though the quantity of generation thereof is small.

Then, since the intermediate product with excellent flammability thus collected and stored can be inhaled into the above-mentioned combustion chamber in the next admission stroke, the combustion quality of the internal-combustion engine can be improved successfully. Especially on low-temperature starting, the intermediate product can contribute to improve its inflammability and thereby the combustion quality of the internal-combustion engine can be largely improved. Then, by consuming the generated intermediate product to improve the combustion quality of the internal-combustion engine, for example, emission of HC, CO, and NOx, etc. out of a vehicle can be reduced, as well as harmful intermediate products can be certainly collected and consumed to prevent them from being emitted outside the vehicle.

Moreover, another feature of the control device according to the present invention is also in that the device comprises a port injection means to inject the above-mentioned fuel into the intake passage upper stream than the above-mentioned intake valve of the above-mentioned internal-combustion engine and a cylinder injection rate determination means to determine the cylinder injection rate which is a rate of a cylinder injection quantity which is the quantity of the above-mentioned fuel injected from the above-mentioned port injection means to the sum of a port injection quantity which is the quantity of the above-mentioned fuel injected from the above-mentioned port injection means and the above-mentioned cylinder injection quantity and, based on the above-mentioned cylinder injection rate determined by the above-mentioned cylinder injection rate determination means, the above-mentioned fuel injected from the above-mentioned port injection means is supplied to the combustion chamber of the above-mentioned internal-combustion engine in addition to the above-mentioned fuel injected from the above-mentioned cylinder injection means.

In accordance with this, since main injection can allow unburnt fuel to certainly exist and further post injection can allow unburnt fuel to exist by appropriately determining the cylinder injection rate, it becomes possible to generate more intermediate product. Therefore, since the intermediate product thus generated can be collected and stored and can be inhaled into the above-mentioned combustion chamber in the next admission stroke, especially on low-temperature starting, the intermediate product can contribute to improve its inflammability and thereby the combustion quality of the internal-combustion engine can be largely improved.

Moreover, another feature of the control device according to the present invention is also in that the above-mentioned intermediate product generation presumption means presumes the quantity of generation of the above-mentioned intermediate product based on at least one of the residence time in which the above-mentioned fuel supplied in the above-mentioned combustion chamber remains in an unburnt state, the temperature when the above-mentioned fuel supplied in the above-mentioned combustion chamber is in an unburnt state, and the air/fuel ratio of the air-fuel mixture consisting of the above-mentioned fuel and air in the above-mentioned combustion chamber.

In accordance with this, since the quantity of generation of the intermediate product can be presumed based on at least one of the residence time, the temperature, and the air/fuel ratio which are detectable parameters, the quantity of generation of the intermediate product can be presumed quite easily with sufficient accuracy. Then, since the intermediate product can be more efficiently collected and stored by presuming the quantity of generation with sufficient accuracy, the stored intermediate product can be consumed and the combustion quality of the internal-combustion engine can be improved certainly.

Furthermore, another feature of the control device according to the present invention is also in that the device comprises an alcohol concentration detection means to detect the alcohol concentration which is the concentration of alcohol component contained in the above-mentioned fuel supplied to the combustion chamber of the above-mentioned internal-combustion engine and a temperature detection means to detect the operational status temperature of the above-mentioned internal-combustion engine, the above-mentioned variable valve actuation means keeps the above-mentioned intake valve opened during a predetermined period when the concentration of alcohol component contained in the above-mentioned fuel detected by the above-mentioned alcohol concentration detection means is a predetermined concentration set up beforehand or more and the operational status temperature of the above-mentioned internal-combustion engine detected by the above-mentioned temperature detection means is less than a predetermined temperature set up beforehand.

In accordance with this, in the situation where an internal-combustion engine is operating (working) at low temperature, the intermediate product can be preferentially generated and collected, and the stored intermediate product can be consumed at the time of combustion. Therefore, the combustion quality of the internal-combustion engine on low-temperature starting can be largely improved.

DESCRIPTION OF EMBODIMENTS a. First Embodiment

Hereafter, a control device of an internal-combustion engine according to the first embodiment of the present invention (hereinafter, may be simply referred to as "the present device") will be explained referring to drawings.

Figure 1:
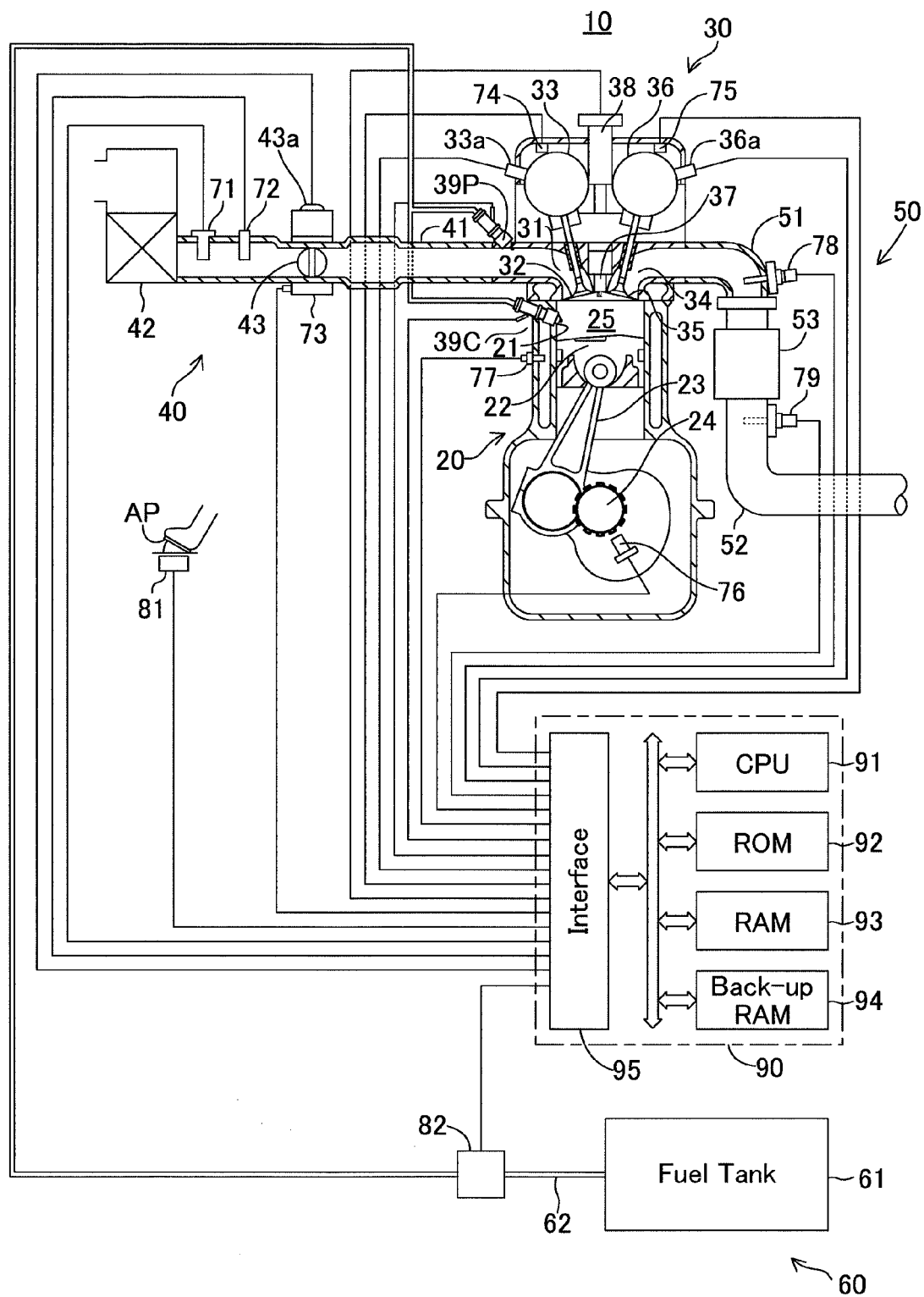
FIG. 1 is a figure showing the schematic configuration of a multicylindered internal combustion engine to which a control device according to an embodiment of the present invention is applied.

FIG. 1 shows the schematic configuration of a system wherein the present device is applied to a four-cycle spark-ignited multicylindered (in-line four-cylinder) internal-combustion engine 10. In addition, although FIG. 1 shows only the section of a specific cylinder, other cylinders also has the same configuration.

This internal-combustion engine 10 is equipped with a cylinder block part 20 containing a cylinder block, a cylinder block lower case, oil pan, etc., a cylinder head part 30 fixed on the cylinder block part 20, an intake system 40 for supplying air-fuel mixture of alcohol-blended fuel to the cylinder block part 20, an exhaust system 50 for emitting exhaust gas from the cylinder block part 20 outside, and a fuel system 60 for supplying fuel to the intake system 40.

The cylinder block part 20 contains a cylinder 21, a piston 22, a connecting rod 23, and a crankshaft 24. The piston 22 reciprocates the inside of the cylinder 21, the reciprocation of the piston 22 is transmitted to the crankshaft 24 through the connecting rod 23 and thereby the crankshaft 24 rotates. The wall surface of the cylinder 21 and the upper surface of the piston 22 form a combustion chamber 25 with the undersurface of the cylinder head part 30.

The cylinder head part 30 is equipped with an intake port 31 communicated to the combustion chamber 25, an intake valve 32 which opens and closes the intake port 31, a variable valve actuation mechanism 33 which includes an intake cam shaft which drives the intake valve 32 and continuously changes the phase angle of the intake cam shaft and the maximum valve lift of the intake valve 32, an actuator 33a of the variable valve actuation mechanism 33, an exhaust port 34 communicated to the combustion chamber 25, an exhaust valve 35 which opens and closes the exhaust port 34, a variable exhaust timing controller 36 which includes an exhaust cam shaft which drives exhaust valve 35 and continuously changes the phase angle of the exhaust cam shaft, a spark plug 37, an igniter 38 containing an ignition coil which generates high voltage given to the spark plug 37, a port injection valve 39P which injects fuel into the intake port 31 upper stream than the intake valve 32, and a cylinder injection valve 39C which injects fuel directly into the combustion chamber 25. Therefore, the internal-combustion engine 10 in this first embodiment is equipped with a dual injection system which comprises the port injection valve 39P and the cylinder injection valve 39C.

One port injection valve 39P and one cylinder injection valve 39C are respectively disposed in each combustion chamber 25. Therefore, each of the multiple cylinders is equipped with the port injection valve 39P and the cylinder injection valve 39C which supply fuel independently from other cylinders. In addition, in this first embodiment, although the internal-combustion engine 10 equipped with the dual injection system wherein two fuel injection valves, the port injection valve 39P and the cylinder injection valve 39C, were disposed separately is explained, the present invention is not limited to such an internal-combustion engine. For example, it may be an internal-combustion engine which has one fuel injection valve which has both a cylinder injection function and a port injection function.

The intake system 40 is equipped with an intake pipe 41 which contains an intake manifold respectively connected with the inlet port 31 of each cylinder, an air filter 42 disposed in the end of the intake pipe 41, a throttle valve 43 which is in the intake pipe 41 and can vary an intake opening area, and an actuator 43a of the throttle valve 43. The intake port 31 and intake pipe 32 constitute an intake passage.

The exhaust system 50 is equipped with an exhaust manifold 51 respectively connected with the inlet port 34 of each cylinder, an exhaust pipe 52 connected to the collecting part of the exhaust manifold 51, a catalyst 53 (three-way catalyst) disposed in the exhaust pipe 52. The exhaust port 34, exhaust manifold 51, and exhaust pipe 52 constitute an exhaust passage.

The fuel system 60 is equipped with a fuel tank 61 and a fuel-supplying pipe 62. The fuel tank 61 stores "the alcohol-blended fuel" which is a mixture of gasoline and ethanol, for example. In addition, the fuel tank 61 may be filled up with the fuel only consisting of the gasoline which does not contain ethanol at all, and the fuel which consists only of ethanol which does not contain gasoline at all. The fuel-supplying pipe 62 is a pipe which connects the fuel tank 61, the port injection valve 39P, and the cylinder injection valve 39C. The fuel in the fuel tank 61 is pressure-fed by the port injection valve 39P and the cylinder injection valve 39C through the fuel-supplying pipe 62 by a fuel pump which is disposed in the fuel tank 61, but not shown.

On the other hand, this system is equipped with a hot-wire-type air flow meter 71, an intake-air-temperature sensor 72, a throttle position sensor 73, an intake cam position sensor 74, an exhaust cam position sensor 75, a crank position sensor 76, a water temperature sensor 77, an upper stream side air/fuel ratio sensor 78, a lower stream side air/fuel ratio sensor 79, an accelerator position sensor 81, and an alcohol concentration sensor 82.

The air flow meter 71 is configured so as to output a signal according to a mass flow rate (mass of the air inhaled by the engine 10 per unit time (in the present invention, may be referred to as an "inhaled air mass")) Ga of the inhaled air which flows through the inside of the intake pipe 41. The intake-air-temperature sensor 72 is configured so as to output a signal according to the intake air temperature THA of the inhaled air which flows through the inside of the intake pipe 41. The throttle position sensor 73 is configured so as to detect the aperture of the throttle valve 43 and output a signal showing the throttle valve aperture TA.

The intake cam position sensor 74 is disposed near the intake cam shaft. The intake cam position sensor 74 is configured so as to generate a signal which has one pulse for every 90 degree rotation of the intake cam shaft (that is, every 180 degree rotation of the crankshaft 24). The exhaust cam position sensor 75 is disposed near the exhaust cam shaft. The exhaust cam position sensors 75 is configured so as to generate a signal which has one pulse for every 90 degree rotation of the exhaust cam shaft (that is, every 180 degree rotation of the crankshaft 24).

The crank position sensor 76 is configured so as to output a signal which has a broad pulse for every 360 degree rotation of the crankshaft 24. This signal expresses the engine revolving speed NE. Moreover, based on the signals from the intake cam position sensor 74 and the crank position sensor 76, the absolute crank angle CA on the basis of the compression top dead center (TDC) of a standard cylinder (for example, the first cylinder) is acquired. This absolute crank angle CA is set as a "0-degree crank angle" at the compression top dead center of the standard cylinder, increases up to a "720-degree crank angle" according to the rotation angle of a crank angle, and is again set as a 0-degree crank angle at that time. The water temperature sensor 77 is configured so as to detect the temperature of the cooling water corresponding to the operational status temperature of the engine 10 and output a signal showing the cooling water temperature THW.

Figure 2:
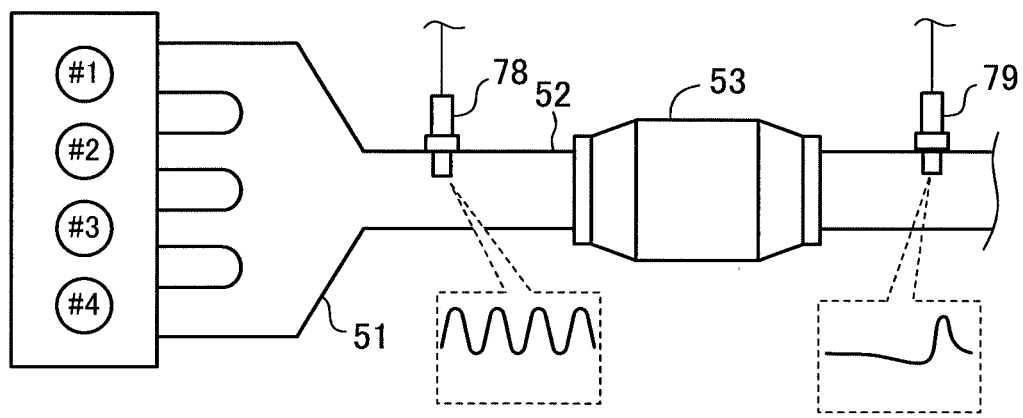
FIG. 2 is a figure showing an aspect where the catalyst, upper stream side air/fuel ratio sensor and lower stream side air/fuel ratio sensor shown in FIG. 1 are disposed in an exhaust passage.

The upper stream side air/fuel ratio sensor 78 is disposed at the upper stream rather than the catalyst 53 in the collecting exhaust passage where respective exhaust passages extending from each cylinder gather (specifically exhaust pipe 52), as shown in FIG. 2. For example, the upper stream side air/fuel ratio sensor 78 is the "limiting current type wide range air/fuel ratio sensor equipped with a diffusion resistance layer" disclosed in Japanese Patent Application Laid-Open (kokai) No. H11-72472, Japanese Patent Application Laid-Open (kokai) No. 2000-65782, and Japanese Patent Application Laid-Open (kokai) No. 2004-69547, etc.

Figure 3:
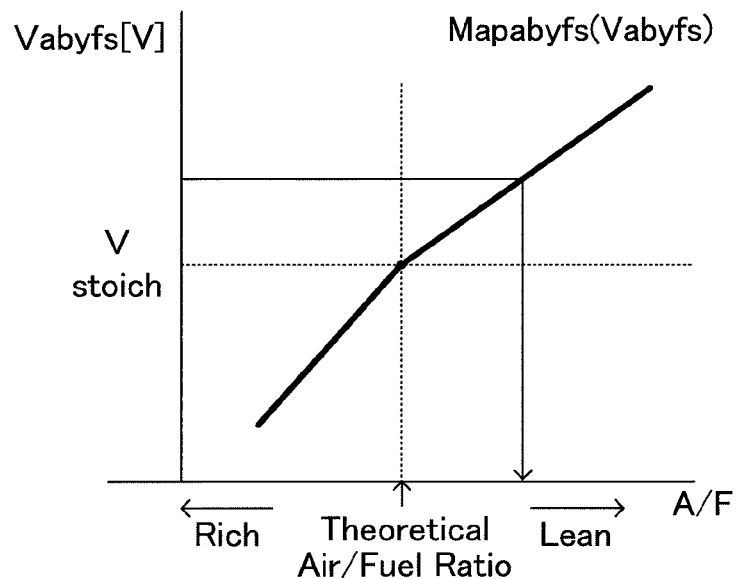
FIG. 3 is a graph showing the relation between the output of the upper stream side air/fuel ratio sensor shown in FIG. 1 and an air/fuel ratio.

And the upper stream side air/fuel ratio sensor 78 generates output value Vabyfs(V) according to the air/fuel ratio of the mixed exhaust gas which passes through the inside of the exhaust pipe 52 and flows into the catalyst 53 (accordingly, the air/fuel ratio of the air-fuel mixture supplied to the engine 10, more specifically the air/fuel ratio of the air-fuel mixture in the combustion chamber 25 of each cylinder). This output value Vabyfs is converted into the upper stream side air/fuel ratio abyfs expressed with the output value Vabyfs (hereinafter, may be referred to as a "detected air/fuel ratio") using the air/fuel ratio conversion table (map) Mapabyfs shown in FIG. 3.

Moreover, as shown in FIG. 2, the lower stream side air/fuel ratio sensor 79 is disposed at the lower stream rather than the catalyst 53 in the collecting exhaust passage (specifically exhaust pipe 52). The lower stream side air/fuel ratio sensor 79 is a well-known electromotive force type oxygen concentration sensor (well-known concentration cell type oxygen concentration sensor using stabilized zirconia). The lower stream side air/fuel ratio sensor 79 generates output value Voxs(V) according to the air/fuel ratio of the mixed exhaust gas which flows out of the catalyst 53 (accordingly, time average value of the air/fuel ratio of the air-fuel mixture supplied to the engine 10 (more specifically, the air/fuel ratio of the air-fuel mixture in the combustion chamber 25 of each cylinder)).

Figure 4:
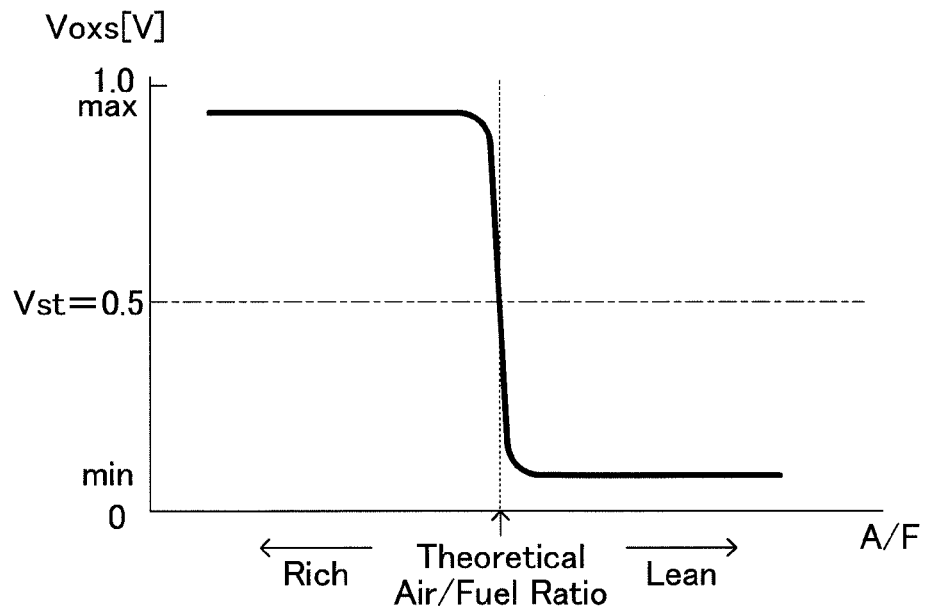
FIG. 4 is a graph showing the relation between the output of the lower stream side air/fuel ratio sensor shown in FIG. 1 and an air/fuel ratio.

As shown in FIG. 4, this output value Voxs becomes the maximum output value max (for example, about 0.9 v) when the lower stream side air/fuel ratio afdown is richer than a theoretical air/fuel ratio, and it becomes the minimum output value min (for example, about 0.1V) when the lower stream side air/fuel ratio afdown is leaner than the theoretical air/fuel ratio, and it becomes the voltage Vst (for example, 0.5V) which is approximately intermediate between the maximum output value max and the minimum output value min when the lower stream side air/fuel ratio afdown is the theoretical air/fuel ratio. Furthermore, this output value Vst changes suddenly from the maximum output value max to the minimum output value min when the lower stream side air/fuel ratio afdown (air/fuel ratio of a mixed exhaust gas) changes from an air/fuel ratio richer than the theoretical air/fuel ratio to an lair/fuel ratio leaner than the theoretical air/fuel ratio, while it changes suddenly from the minimum output value min to the maximum output value max when the lower stream side air/fuel ratio afdown (air/fuel ratio of a mixed exhaust gas) changes from an air/fuel ratio leaner than the theoretical air/fuel ratio to an lair/fuel ratio richer than the theoretical air/fuel ratio.

The accelerator position sensor 81 is configured so as to output a signal showing the operation amount Accp of the accelerator pedal AP operated by a driver.

For example, the alcohol concentration sensor 82 is a well-known electric capacity type sensor (sensor which can measure specific inductive capacity of a measuring object using a pair of electrodes) as disclosed in Japanese Patent Application Laid-Open (kokai) No. H06-27073, etc. The alcohol concentration sensor 82 is configured so as to output an output value according to the alcohol concentration in the fuel flowing through the region where the alcohol concentration sensor 82 is disposed in the fuel-supplying pipe 62 (in the engine 10 according to this first embodiment, ethanol concentration Cetha) using the fact that the specific inductive capacity of alcohol-blended fuel changes according to its alcohol concentration.

An electric brake mechanism 90 is a microcomputer consisting of CPU91 mutually connected through bus, ROM92 which preliminarily memorizes a routine (program) which and CPU91 perform, a table (map, function), and a constant, etc., a backup RAM94 which stores data in a state where a power supply is applied thereto and holds the stored data also while the power supply is shut off, and an interface 95 containing an AD converter.

The interface 95 is connected with the above-mentioned sensors 71 to 79, 81, and 82, and is configured so as to supply signals from the sensors 71 to 79, 81, and 82 to CPU91 and send out drive signals to the actuator 33a of the variable valve actuation mechanism 33, the igniter 38 of each cylinder, the port injection valve 39P and the cylinder injection valve 39C disposed corresponding to each cylinder, and the actuator 43a of the throttle valve 43, according to directions of CPU91.

(Outline of Air/Fuel Ratio Feedback Control)

Next, the outline of the air/fuel ratio feedback control by the present device will be explained. The present device carries out feedback control based on the output value Vabyfs of the upper stream side air/fuel ratio sensor 78, and the output value Voxs of the lower stream side air/fuel ratio sensor 79, so that the air/fuel ratio of the mixed exhaust gas may correspond to a predetermined air/fuel ratios (for example, a theoretical air/fuel ratio, an air/fuel ratio leaner or richer than a theoretical air/fuel ratio, etc.).

The following can be exemplified as an example of this feedback control. Namely, By PID processing on the deviation between the output value Voxs of the lower stream side air/fuel ratio sensor 79 and the predetermined air/fuel ratio Vst (for example, theoretical air/fuel ratio), the amount of subfeedback correction which will be mentioned later is obtained. By applying the value acquired by correcting the output value Vabyfs of the upper stream side air/fuel ratio sensor 78 with this amount of subfeedback correction to the air/fuel ratio conversion table Mapabyfs shown in FIG. 3, an apparent air/fuel ratio is obtained. By PID processing on the deviation between this apparent air/fuel ratio and theoretical air/fuel ratio, the amount of air/fuel ratio feedback (the amount of main feedback correction) is obtained.

Fuel is injected respectively from the port injection valve 39P and the cylinder injection valve 39C of each cylinder in the quantity obtained by correcting the "basic fuel injection quantity obtained based on the engine revolving speed NE, an inhaled air quantity Ga, and a theoretical air/fuel ratio" with this amount of air/fuel ratio feedback. Thus, by respectively adjusting the quantity of the fuel injected from each port injection valve 39P and the cylinder injection valve 39C based on the amount of air/fuel ratio feedback common to all the cylinders, feedback control of the air/fuel ratio of the mixed exhaust gas is carried out.

<Basic Air/Fuel Ratio Control>

Next, the outline of basic air/fuel ratio control by the present device will be explained. In the present device, when the engine 10 is in a steady operation state (what is called, an operational status after warming-up wherein the temperatures the piston 22 and the intake valve 32 are high), according to the sudden changes of the output value Voxs of the lower stream side air/fuel ratio sensor 79, that is, according to whether the inside of the catalyst 53 is an oxidative atmosphere or a reductive atmosphere, the upper stream side air/fuel ratio (air/fuel ratio of the engine 10) is controlled to be a compulsorily leaner air/fuel ratio or a compulsorily richer air/fuel ratio than a theoretical air/fuel ratio. Concretely, as shown in FIG. 4, the upper stream side air/fuel ratio is controlled to be a lean air/fuel ratio when the lower stream side air/fuel ratio is a rich air/fuel ratio based on the output value Voxs of the lower stream side air/fuel ratio sensor 79, while the upper stream side air/fuel ratio is controlled to be a rich air/fuel ratio when the lower stream side air/fuel ratio is a lean air/fuel ratio based on the output value Voxs of the lower stream side air/fuel ratio sensor 79. Moreover, the upper stream side air/fuel ratio is controlled to be changed from a lean air/fuel ratio to a rich air/fuel ratio when the output value Voxs of the lower stream side air/fuel ratio sensor 79 changes suddenly from the maximum output value max to the minimum output value min, while the upper stream side air/fuel ratio is controlled from a rich air/fuel ratio to a lean air/fuel ratio when the output value Voxs of the lower stream side air/fuel ratio sensor 79 changes suddenly from the minimum output value min to the maximum output value max.

Then, the present device controls the fuel injection quantity by the port injection valve 39P and the cylinder injection valve 39C so that the output values of the upper stream side air/fuel ratio sensor 78 and the lower stream side air/fuel ratio sensor 79 may be equivalent to corresponding sensor target values (concretely, values corresponding to an air/fuel ratio richer than a theoretical air/fuel ratio or an air/fuel ratio leaner than a theoretical air/fuel ratio according to the output value Voxs of the lower stream side air/fuel ratio sensor 79) respectively, and carry out feedback control of the air/fuel ratio of the engine 10.

<Determination of Basic Fuel Injection Quantity>

First, an example about the determination of the basic fuel injection quantity Fbase will be explained. As mentioned above, on the determination of the basic fuel injection quantity Fbase, the upper stream side target air/fuel ratio abyfr (namely, target air/fuel ratio of the engine 10) corresponding to the target value of the upper stream side air/fuel ratio sensor output (upper stream side target value) is determined based on the engine revolving speed NE and the throttle valve aperture TA, etc. which are the operational status of the internal-combustion engine 10. As mentioned above, this upper stream side target air/fuel ratio abyfr is beforehand set to be enable to be changed to a value corresponding to an richer air/fuel ratio or leaner air/fuel ratio than a theoretical air/fuel ratio according to the output value Voxs of the lower stream side air/fuel ratio sensor 79. In addition, the upper stream side target air/fuel ratio abyfr is being memorized by RAM93, corresponding to the intake stroke of each cylinder.

Once the upper stream side target air/fuel ratio abyfr is thus determined, the basic fuel injection quantity Fbase is acquired by dividing an cylinder-inhaled air quantity Mc which is an inhaled air quantity in a cylinder entering an intake stroke this time (that is, next combustion cylinder) acquired based on a predetermined table using as arguments the inhaled air mass flow rate Ga being measured by the air flow meter 71 and the engine revolving speed NE obtained based on the output of the crank position sensor 76, by the above-determined upper stream side target air/fuel ratio abyfr. Namely, the basic fuel injection quantity Fbase is the amount of sum totals of the fuel injection quantities through the port injection valve 39P and the cylinder injection valve 39C corresponding to the next combustion cylinder required in order to attain the upper stream side target air/fuel ratio abyfr.

<Calculation of Cylinder Injection Quantity and Port Injection Quantity>

Next, the calculation of cylinder injection quantity Fid and port injection quantity Fip will be explained. On the calculation of cylinder injection quantity Fid and port injection quantity Fip, based on a predetermined table using as arguments the engine revolving speed NE which is the operational status of the internal-combustion engine 10, the above-mentioned cylinder-inhaled air quantity Mc, and circulating water temperature THW, a cylinder injection rate R (hereinafter, may be referred to as an assignment rate R) which is a ratio of the cylinder injection quantity Fid to the sum of the cylinder injection quantity Fid and the port injection quantity Fip (more properly, ratio of the basic cylinder injection quantity Fbased to the sum of the basic cylinder injection quantity Fbased, which will be mentioned later, and the basic port injection quantity Fbasep, which will be mentioned later). Thereby, according to the operational status of the engine 10, the cylinder injection rate R can be suitably changed.

One the cylinder injection rate R (namely, the assignment rate R) is thus determined according to the operational status of the engine 10, the basic cylinder injection quantity Fbased (=Fbase×R) is determined by multiplying the above-acquired basic fuel injection quantity Fbase by the assignment rate R. Similarly, the basic port injection quantity Fbasep (=Fbase× (1-R)) is determined by multiplying the above-acquired basic fuel injection quantity Fbase by a value (1-R). Then, a final cylinder injection quantity Fid is determined by multiplying the basic cylinder injection quantity Fbased by the above-mentioned subfeedback correction, and a final port injection quantity Fip is determined by multiplying the basic port injection quantity Fbasep by the above-mentioned subfeedback correction and main feedback correction.

In addition, as for the subfeedback correction, specifically, it can be acquired by carrying out PID processing on the deviation from the lower stream side target value Voxsref which is a target value of the lower stream side air/fuel ratio sensor output based on the engine revolving speed NE and the throttle valve aperture TA, etc. which are the operational status of the internal-combustion engine 10. Here, the lower stream side target value Voxsref is set up so that the lower stream side target air/fuel ratio corresponding to the lower stream side target value Voxsref may always correspond to the above-mentioned upper stream side target air/fuel ratio abyfr. Moreover, as for the main feedback correction, concretely, it can be acquired by acquiring the detected air/fuel ratio abyfs at present by the upper stream side air/fuel ratio sensor 78 based on the output value Vabyfs of the upper stream side air/fuel ratio sensor 78 and the air/fuel ratio conversion table Mapabyfs shown in FIG. 3 and carrying out PID processing on the deviation from this detected air/fuel ratio abyfs.

Thus, the present device injects directly into cylinder, the fuel in the cylinder injection quantity Fid obtained by correcting the basic cylinder injection quantity Fbased with the subfeedback correction, through the cylinder injection valve 39C to the next combustion cylinder in this combustion cycle. Moreover, it inject the fuel in the port injection quantity Fip obtained by correcting the basic port injection quantity Fbasep with the subfeedback correction and the main feedback correction through the port injection valve 39P to the next combustion cylinder in this combustion cycle. By these, the present device can carry out feedback control of the air/fuel ratio of the engine 10 so that it may become an air/fuel ratio leaner or richer than a theoretical air/fuel ratio.

(Discharge Characteristic of Intermediate Product when using Alcohol-Blended Fuel)

It is said that the unburnt ethanol of the supplied fuel is oxidized to generate aldehyde (specifically, formaldehyde (HCHO) and acetaldehyde ($CH_3CHO$)) as an intermediate product when the fuel with which ethanol is mixed is supplied to the engine 10. As mentioned above, in order to suppress the generation of aldehyde which is a toxic substance itself, it has been conventionally proposed to further oxidize the generated aldehyde to consume the same. By the way, since aldehyde is an intermediate oxide of alcohol and its chemical structure is unstable, it has the characteristic which is easily oxidized (namely, combustible). Therefore, if aldehyde which is an intermediate product which generates when alcohol-blended fuel is supplied can be collected efficiently and consumed in the next combustion cylinder, discharge to the vehicles exterior of aldehyde which is a toxic substance can be suppressed effectively and the start-up performance (preferably low-temperature start-up performance) of the internal-combustion engine 10 can be also improved. Here, it is said that, as for factors affecting generation of aldehyde when alcohol-blended fuel is supplied to the engine 10, residence time, gas temperature, and an air/fuel ratio can serve as such factors. Hereafter, the influence of each of these factors on generation of aldehyde will be explained. In addition, the graphs in FIG. 5 to FIG. 7 referred to in the following explanation are based on the graphs showing the experimental result described in the Japan Society Of Mechanical Engineers Series B Vol. 52 (1986-1) No. 473, P. 238 to P. 247.

<Influence of Residence Time>

Figure 5:
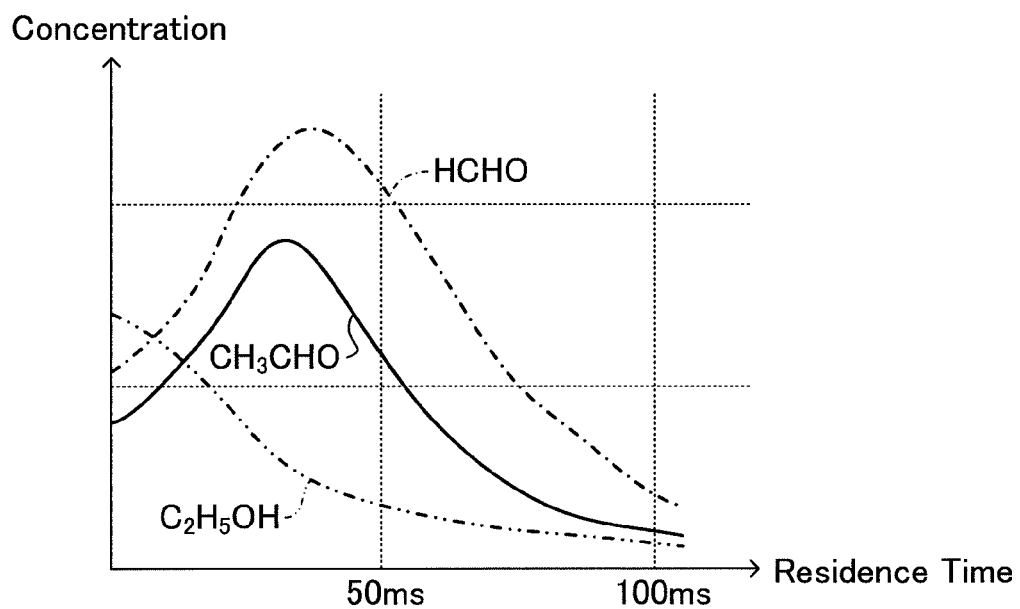
FIG. 5 is a graph showing the concentration change of alcohol and aldehyde with residence time.

In general, it is said that there is a tendency for aldehyde once generated to decrease as time period during which the injected fuel stays in a cylinder in the unburnt state, i.e., residence time, becomes longer when the alcohol-blended fuel in which ethanol ($C_2H_5OH$) is mixed to the engine 10. Specifically, for example, as FIG. 5 shows the concentration change of alcohol and aldehyde to residence time, the concentration of the alcohol (ethanol ($C_2H_5OH$)) contained in the alcohol-blended fuel which exists in a cylinder has a tendency to decrease uniformly as the residence time becomes long, while the concentrations of the formaldehyde (HCHO) and acetaldehyde ($CH_3CHO$) which are aldehyde have a tendency to once goes up with progress of residence time, but thereafter decrease as the residence time becomes longer. In addition, FIG. 5 shows the concentration change of the alcoholic and aldehyde over the residence time when the air/fuel ratio and gas temperature are maintained constant.

In this connection, since the formaldehyde (HCHO) concentration and acetaldehyde ($CH_3CHO$) concentration increase with a decrease in the alcohol (ethanol ($C_2H_5OH$)) concentration despite the difference in the time to become a peak, it can be understood that aldehyde which is an intermediate product (or intermediate oxide) generates with the progress of an oxidation reaction of alcohol in an unburnt state. And it can be understood that aldehyde thus generated disappears by the progress of an oxidation reaction of the aldehyde when the aldehyde d further remains in a cylinder. Therefore, it can be said that it is important to keep the residence time during which alcohol (ethanol ($C_2H_5OH$)) in an unburnt state remains in a cylinder from becoming long after combustion in order to supply alcohol-blended fuel to the engine 10 to generate aldehyde efficiently.

<Influence of Gas Temperature>

Figure 6:
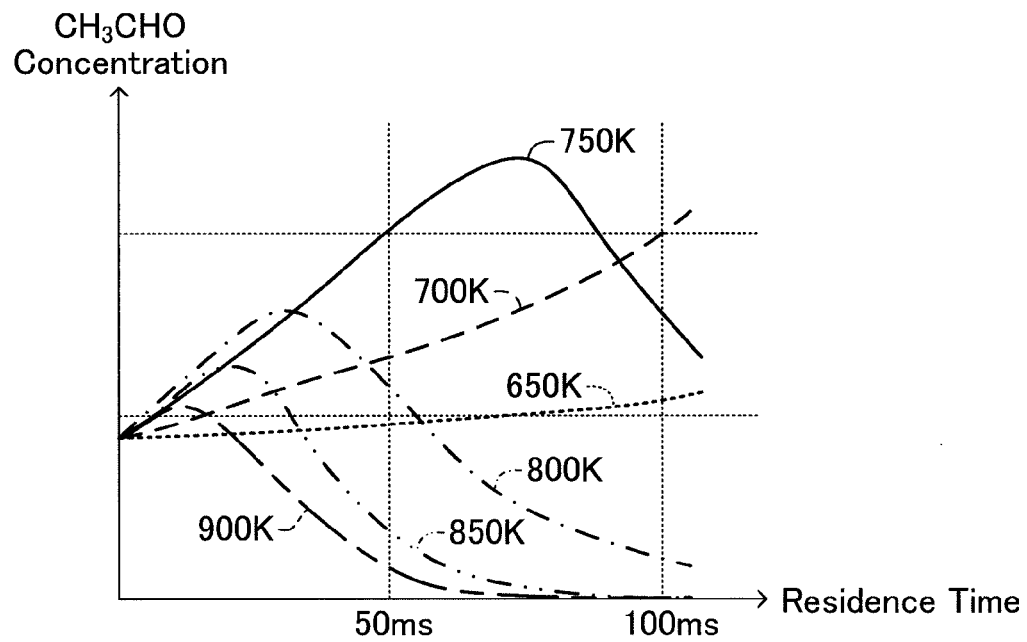
FIG. 6 is a graph showing the concentration change of acetaldehyde with residence time when changing gas temperature.

In general, it is said that there is a tendency for aldehyde to generate more as the temperature of unburnt fuel after the injected fuel burns (also including the ambient temperature in the combustion chamber 25 etc.), i.e., the gas temperature, becomes higher when the alcohol-blended fuel in which ethanol ($C_2H_5OH$) is mixed to the engine 10. Specifically, for example, as FIG. 6 shows the concentration change of aldehyde (acetaldehyde ($CH_3CHO$)) to residence time when changing gas temperature, the concentration has a tendency to increase as the gas temperature after combustion rises, despite the difference in the time to become a peak. In addition, FIG. 6 shows the concentration change of the aldehyde (acetaldehyde ($CH_3CHO$) over the change of the gas temperature when the air/fuel ratio is maintained constant.

In this connection, since aldehyde generates as an intermediate product (intermediate oxide) with the progress of an oxidation reaction of alcohol, it can be understood that the oxidation reaction of alcohol progresses in association with the increase in gas temperature (also including ambient temperature) and the aldehyde as the intermediate oxide becomes more likely to generate. And it can be understood that the residence time at which the concentration of the aldehyde becomes a peak is different from that at which the gas temperature becomes a peak since aldehyde thus generated disappears by the progress of an oxidation reaction of the aldehyde when the aldehyde d further remains in the hot cylinder. Therefore, it can be said that it is important to appropriately keep the gas temperature within a suitable temperature range, in addition to keep the residence time from becoming too long as mentioned above, in order to supply alcohol-blended fuel to the engine 10 to generate aldehyde efficiently.

<Influence of Air/Fuel Ratio>

Figure 7:
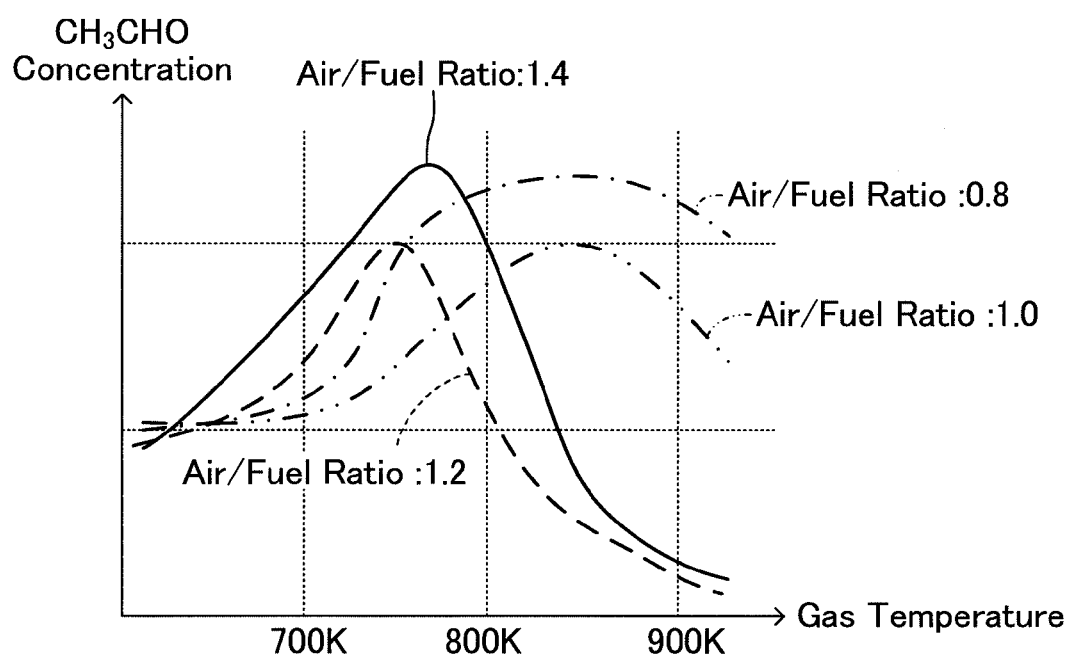
FIG. 7 is a graph showing the concentration change of acetaldehyde with gas temperature when changing an air/fuel ratio.

In general, it is said that there is a tendency for aldehyde to generate more as the air/fuel ration in a combustion chamber becomes leaner when the alcohol-blended fuel in which ethanol ($C_2H_5OH$) is mixed to the engine 10. Specifically, for example, as FIG. 7 shows the concentration change of aldehyde (acetaldehyde ($CH_3CHO$)) to the gas temperature when changing the air/fuel ratio, the concentration has a tendency to increase as the gas temperature after combustion rises despite the difference in the time to become a peak and, especially when the air/fuel ratio is lean, the gas temperature at which the concentration becomes a peak shifts to lower temperature. In addition, FIG. 7 shows the concentration change of the aldehyde (acetaldehyde ($CH_3CHO$) over the change of the air/fuel ratio when the residence time is maintained constant.

In this connection, since aldehyde generates as an intermediate product (intermediate oxide) with the progress of an oxidation reaction of alcohol, it can be understood that the oxidation reaction becomes more likely to progress and the aldehyde as the intermediate oxide becomes more likely to generate even at low gas temperature when the air/fuel ratio is lean wherein oxygen is excessive. Therefore, it can be said that it is important to maintain the air/fuel ratio to be lean, in addition to keep the residence time from becoming too long and appropriately keep the gas temperature within a suitable temperature range, in order to supply alcohol-blended fuel to the engine 10 to generate aldehyde efficiently.

By the way, generally, when the upper stream side target air/fuel ratio abyfr (air/fuel ratio of the engine 10) is a lean air/fuel ratio, nitrogen oxide (NOx) is contained in the mixed exhaust gas exhausted from the cylinder after combustion. Namely, when combustion arises at a lean air/fuel ratio, NOx will exist in this cylinder after combustion. Moreover, it is said that, in oxidation reaction of alcohol (for example, ethanol ($C_2H_5OH$)), an OH radical produced by the action of NOx (specifically, conversion action of NO/$NO_2$) may get involved deeply and aldehyde (specifically, formaldehyde (HCHO) and acetaldehyde ($CH_3CHO$)) is easily produced by the influence of the OH radical. Also from this, it can be said that it is important to maintain the air/fuel ratio to be lean, in addition to keep the residence time from becoming too long and appropriately keep the gas temperature within a suitable temperature range, in order to supply alcohol-blended fuel to the engine 10 to generate aldehyde efficiently.

(Presumption of Quantity of Generation of Intermediate Product in Internal-Combustion Engine to which Alcohol-Blended Fuel is Supplied)

As mentioned above, in order to supply alcohol-blended fuel, in which ethanol ($C_2H_5OH$) is mixed, to the engine 10 to efficiently generate aldehyde (specifically, formaldehyde (HCHO) and acetaldehyde ($CH_3CHO$)), first, it is preferable to maintain the residence time not too long (for example, 80 or less ms, more specifically about 50 ms, taking into consideration the revolving speed NE of the engine 10) based on the graph shown in FIG. 5, and to maintain the gas temperature not too high (for example, about 750 K to 850 K, taking into consideration the temperature of the exhaust gas from the engine 10.) based on the graph shown in FIG. 6, and to maintain the upper stream side target air/fuel ratio abyfr (air/fuel ratio of the engine 10) to an air/fuel ratio on the leaner side rather than a theoretical air/fuel ratio based on the graph shown in FIG. 7. Then, when the residence time, gas temperature, and air/fuel ratio are used as a generating condition for the intermediate product and the internal-combustion engine 10 is operated so as to match this generating condition, aldehyde which is an intermediate product can be efficiently generated in the cylinder after combustion.

Moreover, as apparent from the graph shown in FIG. 5 to FIG. 7, the residence time, gas temperature and air/fuel ratio constituting the generating conditions of an intermediate product are mutually related with the concentration of the intermediate product (specifically, aldehyde). Therefore, by fixing any element of the residence time, gas temperature and air/fuel ratio, in consideration of change of other elements, the quantity of generation of the intermediate product can be presumed (or determined) with sufficient accuracy.

For this reason, for example, in the situation where the internal-combustion engine 10 is started up at low temperature (specifically, a situation where the cooling water temperature THW of the internal-combustion engine 10 is low), by operating the internal-combustion engine 10 so that the holding time, the gas temperature, and the air/fuel ratio which were set up as the above-mentioned generating conditions for an intermediate product may be attained, aldehyde which is an intermediate product can be generated efficiently in the cylinder after combustion, and the quantity of generation of the aldehyde which is an intermediate product can be presumed with sufficient accuracy.

<Post Injection>

As mentioned above, aldehyde (specifically, formaldehyde (HCHO) and acetaldehyde ($CH_3CHO$)) generates when the alcohol (for example, ethanol ($C_2H_5OH$)) contained in alcohol-blended fuel exists in an unburnt state and is oxidized to some extent. In this case, in accordance with the above-mentioned generating conditions for the intermediate product (specifically, aldehyde), for example, when the upper stream side target air/fuel ratio abyfr is set up to a large value (namely, set up to lean air/fuel ratio), the quantity of alcohol (for example, ethanol ($C_2H_5OH$)) contained in alcohol-blended fuel and existing in an unburnt state may become smaller, and the production of aldehyde (specifically, formaldehyde (HCHO) and acetaldehyde ($CH_3CHO$)) may decrease.

By the way, conventionally, for example, for the purpose of reduction of emission on low-temperature starting, in order to raise the internal temperature (ambient temperature) of the catalyst 53 early to activate it early, separately from the above-mentioned injection of the cylinder injection and port injection (what is called, main injection), post injection in which only a small quantity of fuel is injected in an exhaust stroke may be performed. Concretely, in this post injection, as widely known, the cylinder injection valve 39C compulsorily injects a post injection quantity Fid_p of fuel against the pressure in the cylinder in an exhaust stroke on low-temperature starting.

Therefore, the alcohol (for example, ethanol ($C_2H_5OH$)) in an unburnt state can be made certainly exist in the cylinder which is in an exhaust stroke or shifts to an exhaust stroke by appropriately securing (increasing) the post injection quantity Fid_p injected by the cylinder injection valve 39C. Thus, since the above-mentioned gas temperature is promptly raised by the post injection of alcohol-blended fuel into the cylinder in a high temperature atmosphere after combustion, oxidation reaction of the alcohol (ethanol ($C_2H_5OH$)) in the injected alcohol-blended fuel can occur and more aldehyde (specifically, formaldehyde (HCHO) and acetaldehyde ($CH_3CHO$)) which is an intermediate product can be generated. In addition, the gasoline component of the alcohol-blended fuel post-injected in the post injection quantity Fid_p is supplied to the catalyst 53 through an exhaust passage consisting the exhaust port 34, the exhaust manifold 51 and the exhaust pipe 52. Thereby, the supplied fuel (gasoline component) can raise the internal temperature (ambient temperature) of the catalyst 53 early by being oxidized (burnt) inside of the catalyst 53.

(Recovery of Intermediate Product Generated)

As mentioned above, aldehyde (specifically, formaldehyde (HCHO) and acetaldehyde ($CH_3CHO$)) which is the intermediate product generated by supplying the alcohol-blended fuel with ethanol ($C_2H_5OH$) mixed therein to the engine 10 is collected in the intake passage which consists of the inlet port 31 and the intake pipe 32. More particularly, in the present invention, after the post injection in an exhaust stroke, the intake valve 32 is compulsorily opened to a high-pressure cylinder, the burnt gas containing a large quantity of aldehyde (specifically, formaldehyde (HCHO) and acetaldehyde ($CH_3CHO$)) which exist in a cylinder is blown back to be collected and stored. In addition, although any kind of control may be adopted to blow the burnt gas back into the intake passage, as an example, a cold VVT control can be used.

The cold VVT control in the present invention adjusts the timing of opening and closing of the intake valve 32 and/or the timing of opening and closing and the valve lift of the exhaust valve 35 (as compared with those by a usual non-cold VVT control) in an exhaust stroke of the engine 10 to increase the quantity of the burnt gas in the combustion chamber 25 which blows back to the intake passage through the surroundings of the intake valve 32 (blown-back quantity of burnt gas) (as compared with that by a usual non-cold VVT control). In addition, such an operation which increases the quantity of the burnt gas blown back is also referred to as an internal EGR. Here, when burnt gas is thus blown back, since the burnt gas containing the aldehyde (specifically, formaldehyde (HCHO) and acetaldehyde ($CH_3CHO$)) with excellent flammability is stored (housed) in the intake passage, for example, it is preferable that the cylinder injection quantity Fid and the port injection quantity Fip which are determined as mentioned above and injected from each cylinder injection valve 39C and the port injection valve 39P is decreased (from the quantity adjusted with the subfeedback correction and main feedback correction as mentioned above).

(Actual Operation)

Figure 8:
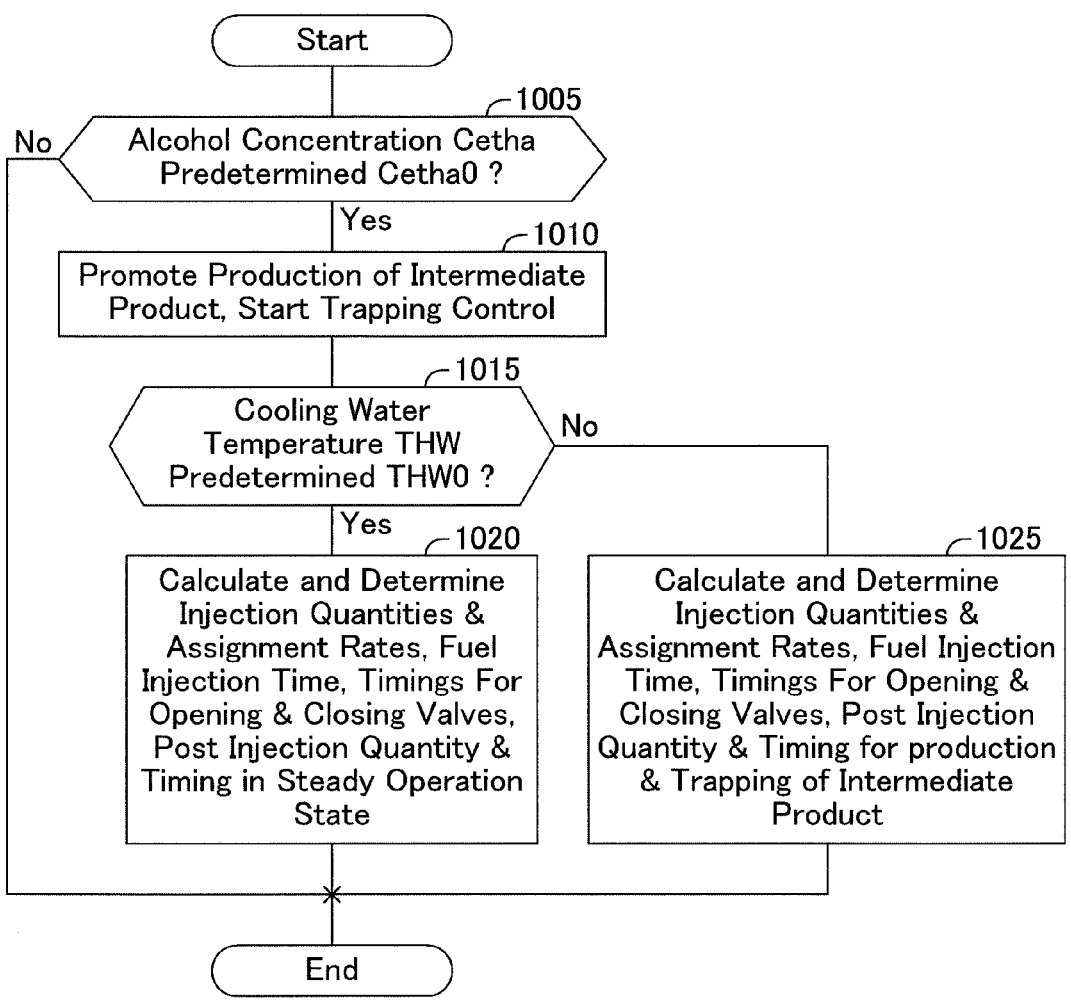
FIG. 8 is a flow chart showing the processing routine according to the first embodiment of the present invention, which the CPU shown in FIG. 1 performs.

Next, the actual operation of the control device according to the first embodiment will be explained. FIG. 8 is a flow chart which shows an example of the flow of the processing routine for "collecting and storing the intermediate product generated from alcohol-blended fuel" performed by CPU91 of the present device. In this example, first, in Step 1005, whether the concentration of the ethanol contained in the alcohol-blended fuel supplied to the engine 10 is a predetermined value Cetha0 or more based on the output value Cetha of the alcohol concentration sensor 82.

Specifically, the output value Cetha of the alcohol concentration sensor 82 is acquired for every predetermined short sampling time ts (for example, 4 ms (4 milliseconds)). Then, when the output value Cetha of the alcohol concentration sensor 82 acquired for every sampling time ts is the predetermined value Cetha0 or more, the concentration of the ethanol contained in the alcohol-blended fuel supplied to the engine 10 is judged to be sufficient for producing aldehyde which is an intermediate product ("Yes" at Step 1005), the control for promoting the generation of the intermediate product and trapping (collecting and storing) the same is started at Step 1010. On the other hand, when the output value Cetha of the alcohol concentration sensor 82 acquired for every sampling time ts is less than the predetermined value Cetha0, the concentration of the ethanol contained in the alcohol-blended fuel supplied to the engine 10 is judged to be insufficient for producing aldehyde which is an intermediate product ("No" at Step 1005), and the execution of the processing routine is ended at Step 1030.

In the present invention, as mentioned above, on low-temperature starting, aldehyde (specifically, formaldehyde (HCHO) and acetaldehyde ($CH_3CHO$)) which is an intermediate product generated by alcohol-blended fuel's being injected to the engine 10 and burnt through a compression stroke as well as generated by post injection is collected and stored in the intake passage in an exhaust stroke, and the stored intermediate product is inhaled in the next intake stroke. For this reason, at Step 1010, based on the fact that the alcohol concentration Cetha contained in the alcohol-blended fuel is high, the control for promoting the generation of the intermediate product and trapping (collecting and storing) the same is started, and it is judged whether the cooling water temperature THW is a predetermined value THW0 or more at Step 1015.

Namely, at Step 1015, the output value THW from the water temperature sensor 77 is acquired. Then, when the acquired output value THW of the water temperature sensor 77 is a predetermined value THW0 or more, it is judged that the engine 10 has already been in a steady operation state ("Yes" at Step 1015) and the engine 10 which has already been in a steady operation state is operated in accordance with a usual embodiment at Step 1020. On the other hand, when the acquired output value THW of the water temperature sensor 77 is less than the predetermined value THW0, it is judged that the engine 10 is in the state of low temperature starting ("No" at Step 1015) and the engine 10 is operated so that the generation of the intermediate product may be promoted to be trapped (collected and stored) at Step 1025.

At Step 1020, since the engine 10 has already been in a steady operation state, in accordance with a usual embodiment, the injection quantities and assignment rates when the cylinder injection valve 39C and the port injection valve 39P inject fuel, the fuel injection time, the timings for opening and closing the intake valve 32 and exhaust valve 35, and the injection quantity and timing of the post injection by the cylinder injection valve 39C are respectively calculated and determined, and the engine 10 is operated based thereon.

Concretely, as for the fuel injection quantity and fuel injection time that the cylinder injection valve 39C and the port injection valve 39P inject fuel when the engine 10 is in a steady operation state, in accordance with the above-mentioned air/fuel ratio feedback control, the basic cylinder injection quantity Fbased is determined by multiplying the basic fuel injection quantity Fbase by the assignment rate R, while the basic port injection quantity Fbasep is determined by multiplying the basic fuel injection quantity Fbase by a value (1-R). In this case, the assignment rate R is determined according to the operational status of the engine 10. Then, a final cylinder injection quantity Fid is determined by multiplying the basic cylinder injection quantity Fbased by the above-mentioned subfeedback correction, and a final port injection quantity Fip is determined by multiplying the basic port injection quantity Fbasep by the above-mentioned sub-feedback correction and main feedback correction.

Moreover, the time when the cylinder injection valve 39C and the port injection valve 39P inject the cylinder injection quantity Fid of fuel and the port injection quantity Fip of fuel when the engine 10 is in a steady operation state is determined to be in an admission stroke, in principle, based on the engine revolving speed NE and load condition (specifically, inhaled air mass flow rate Ga etc.). In addition, especially the fuel injection time of the cylinder injection valve 39C can be determined so as to inject the cylinder injection quantity Fid of fuel in a compression stroke, for example. Thereby, What is called stratified charge combustion wherein fuel is ignited and burnt in a state before the injected fuel spreads widely in the combustion chamber 25, i.e., a state where comparatively dense air-fuel mixture gathers near the spark plug 37 also becomes possible.

Moreover, the timing for opening and closing the intake valve 32 and exhaust valve 35 when the engine 10 is in a steady operation state are also determined based on the engine revolving speed NE and load condition (specifically, inhaled air mass flow rate Ga etc.). Namely, as for the intake valve 32, in principle, it is made into an opened valve state only in an admission stroke and made into a closed valve state in a compression stroke, expansion stroke and exhaust stroke. In addition, when the engine 10 is in a steady operation state, the valve lifts of the intake valve 32 is suitably changed based on the engine revolving speed NE and load condition (specifically, inhaled air mass flow rate Ga etc.). On the other hand, about the exhaust valve 35, in principle, it is made into an opened valve state only in an exhaust stroke and made into a closed valve state in an admission stroke, compression stroke and expansion stroke. In addition, when the engine 10 is in a steady operation state, the valve lifts of the exhaust valve 35 is also suitably changed based on the engine revolving speed NE and load condition (specifically, inhaled air mass flow rate Ga etc.).

As for the injection quantity and injection time that the cylinder injection valve 39C and the port injection valve 39P inject fuel when the engine 10 is in a steady operation state, as mentioned above, only a small quantity of fuel is injected in an exhaust stroke in principle. However, when the engine 10 is in a steady operation state, the case where the internal temperature (ambient temperature) of the catalyst 53 has already risen by mixed exhaust gas can be assumed. Therefore, the post injection by the cylinder injection valve 39C when the engine 10 is in a steady operation state may be injected for the purpose of suppressing the rise in the internal temperature (ambient temperature) of the catalyst 53, for example.

Thus, at Step 1020, in accordance with a usual embodiment, the injection quantities and assignment rates when the cylinder injection valve 39C and the port injection valve 39P inject fuel, the fuel injection time, the timings for opening and closing the intake valve 32 and exhaust valve 35, and the injection quantity and timing of the post injection by the cylinder injection valve 39C are respectively calculated and determined, and the engine 10 is operated, and then the execution of the processing routine is ended at Step 1030.

At Step 1025, in order to appropriately start up and operate the engine 10 under low temperature, the injection quantities and assignment rates when the cylinder injection valve 39C and the port injection valve 39P inject fuel, the fuel injection time, the timings for opening and closing the intake valve 32 and exhaust valve 35, and the injection quantity and timing of the post injection by the cylinder injection valve 39C are respectively calculated and determined so that the intermediate product may be promoted to generate and trapped (collected and stored), and the engine 10 is operated.

Figure 9:
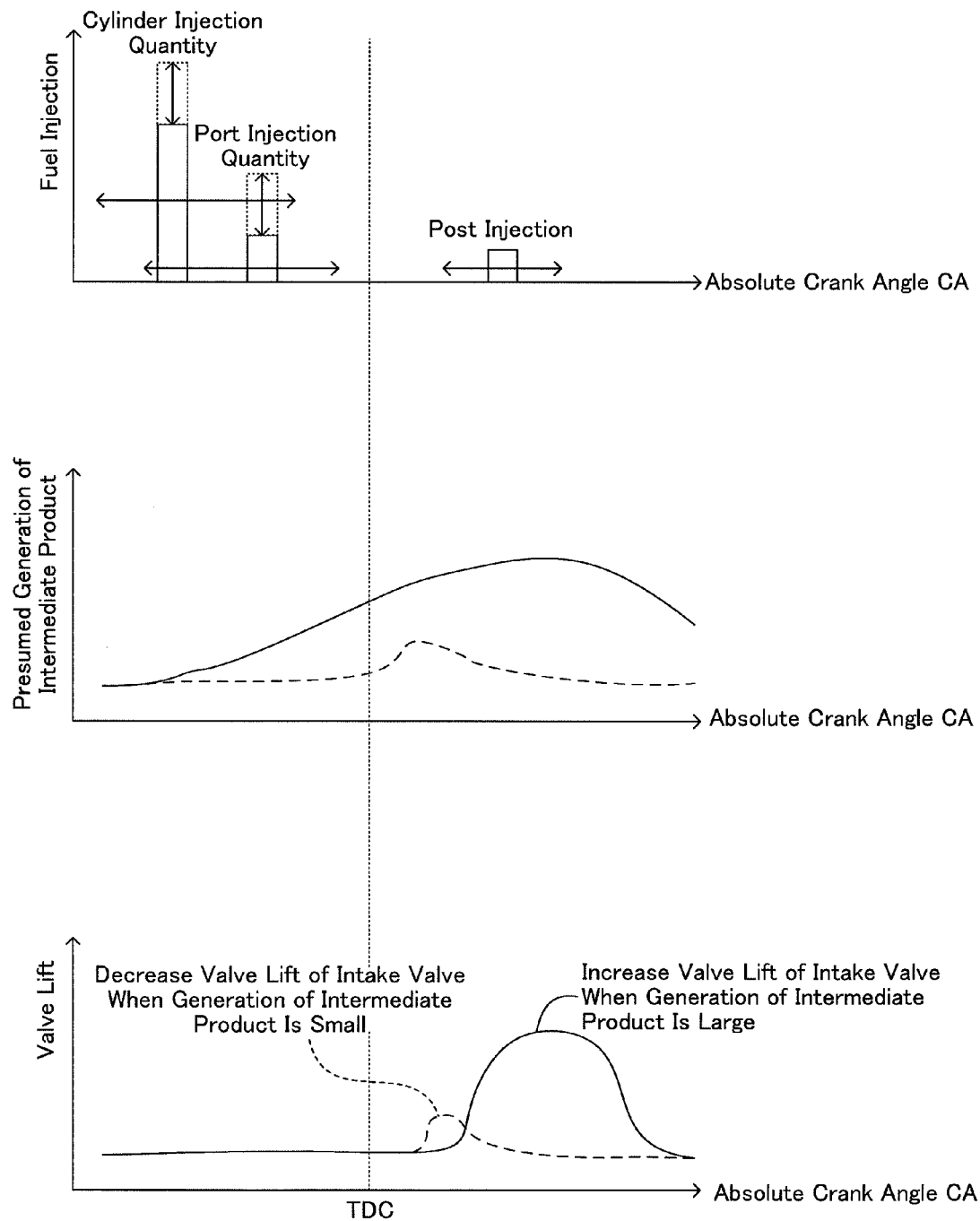
FIG. 9 is a figure for explaining the magnitude of valve lift of an intake valve according to the first embodiment of the present invention, which is changed in accordance with the quantity of generation of an intermediate product.

Concretely, first, in order to promote the generation of the intermediate product, the fuel injection quantity and the assignment rate when the cylinder injection valve 39C and the port injection valve 39P inject fuel, the fuel injection time, the timings for opening and closing the intake valve 32 and exhaust valve 35 are determined based on the quantity of generation of the intermediate product (concretely, aldehyde) presumed based on the "generating conditions of the intermediate product in the internal-combustion engine in which alcohol-blended fuel is supplied" mentioned above. Namely, for example, in a situation where the gas temperature presumed based on the output value THW from the water temperature sensor 77 is low, it is a situation where the quantity of generation of the intermediate product presumed based on the above-mentioned generating conditions of the intermediate product is still small. For this reason, as schematically shown in FIG. 9, for example, when determining the fuel injection quantity to be injected into a cylinder, the cylinder injection rate R should be set as a large value to increase the cylinder injection quantity Fid, while fuel is injected into a cylinder in the first period of a compression stroke to carry out a stratified charge combustion with a lean air/fuel ratio early.

Moreover, the timing for opening and closing the exhaust valve 35 is determined so that the residence time during which the fuel after combustion remains in a cylinder will suit the above-mentioned generating conditions of the intermediate product. Furthermore, the cylinder injection valve 39C post injects only post injection quantity Fid_p in an exhaust stroke, in accordance with the above-mentioned injection quantity and timing of post injection. In addition, as for the timing of this post injection, specifically, it is preferable that fuel is injected in the last period of an exhaust stroke during which aldehyde which is the generated intermediate product exists near the intake valve 32. Thereby, aldehyde which is an intermediate product can be generated efficiently.

Next, in order to collect and store the aldehyde which is the generated intermediate product in an intake passage, the timing for opening and closing the intake valve 32 and the valve lift thereof are determined. First, as for the time to open the intake valve 32, for example, it is preferable to be in a period from the last period of an expansion stroke to an exhaust stroke when the residence time which is one of the generating conditions of the above-mentioned intermediate product has passed (namely, aldehyde which is an intermediate product has been generated) and the pressure is sufficiently high to blow back the burnt gas in a cylinder (namely, a state where the pressure higher than that in an intake passage can be obtained). Thereby, burnt gas including the intermediate product (aldehyde) which exists in a cylinder can be blown back into an intake passage by opening the intake valve 32. And, as for the time to close the intake valve 32, although it is preferable that it shall be just before entering to an admission stroke from an exhaust stroke, for example, it may be closed when a compression stroke is started.

Next, with reference to FIG. 9, the valve lift of the intake valve 32 will be explained concretely. The valve lift of the intake valve 32 is determined based on the presumed quantity of generation the intermediate product (aldehyde) which exists in a cylinder. For example, when the above-mentioned generating conditions of the intermediate product are fulfilled and it is presumed that there is a large quantity of generation of aldehyde which is an intermediate product, the valve lift is increased in order to collect the generated aldehyde in an intake pipe efficiently. Thereby, the generated intermediate product can be collected from the inside of a cylinder into an intake passage with small flow resistance. On the other hand, for example, when the above-mentioned generating conditions of the intermediate product are not sufficiently fulfilled and it is presumed that there is a small quantity of generation of aldehyde which is an intermediate product, the valve lift is decreased in order to raise the flow velocity of the gas flowing from the inside of a cylinder to the intake passage and collect a small quantity of the generated aldehyde in an intake pipe efficiently. Thereby, a suitable stream of the gas from the inside of a cylinder to the intake passage can be generated, and the intermediate product generated in the cylinder can be collected in the intake passage on the stream of the gas.

Then, by thus collecting and storing the burnt gas containing the aldehyde which is the intermediate product in the intake passage, in the next admission stroke, the burnt gas containing the aldehyde which is the intermediate product is inhaled into a cylinder together with air and fuel injected in only the port injection quantity Fip by the port injection valve 39P. And, since the intermediate product (aldehyde) with good oxidization (combustion) characteristics exists in the combustion chamber 25 in a compression stroke, the intermediate product (aldehyde) which is a toxic substance is consumed, and the start-up performance (combustion quality) at low temperature can be successfully improved.

Thus, at Step 1025, the fuel injection quantities and injection time when the cylinder injection valve 39C and the port injection valve 39P inject fuel, the timings for opening and closing the intake valve 32 and exhaust valve 35, and the injection quantity and timing of the post injection by the cylinder injection valve 39C are respectively calculated and determined so that the intermediate product may be promoted to be generated and may be trapped, and the engine 10 is operated, and then the execution of the processing routine is ended at Step 1030.

As mentioned above, in accordance with the first embodiment according to the present invention (specifically, the processing shown in FIG. 8), when the alcohol concentration Cetha of the alcohol-blended fuel supplied to the engine 10 is large and it is judged that the cooling water temperature THW is low ("Yes" at Step 1005 and "No" at Step 1015), operation control of the engine 10 is performed so that the generation of the intermediate product by post injection may be promoted and the intermediate product may be trapped (collected and stored) in an exhaust stroke (Step 1025). Therefore, the intermediate product (specifically, aldehyde) which is an intermediate oxide of the alcohol contained in alcohol-blended fuel and has good oxidization (combustion) characteristics can be consumed and, especially, the low-temperature start-up performance of the engine 10 can be largely improved. Moreover, since the low-temperature start-up performance of the engine 10 is improved by consuming the intermediate product (specifically, aldehyde), the intermediate product (specifically, aldehyde) which is a toxic substance can be prevented from being emitted out of a vehicle.

b. Second Embodiment

In the above-mentioned first embodiment, the present device is applied to the internal-combustion engine 10 equipped with the dual injection system which has the port injection valve 39P and the cylinder injection valve 39C and carried out. In this case, although an anew illustration is omitted, it is also possible to carry out with the application of the present device to the internal-combustion engine 10 which has the port injection valve 39P shown in FIG. 1 omitted and is equipped only with the cylinder injection valve 39C at least. Although this second embodiment will be explained hereafter, since it differs in that the port injection valve 39P is omitted as compared with the configuration of the above-mentioned first embodiment, the same mark will be assigned to the same portion as the above-mentioned first embodiment, and explanation of configuration and the same operation will be omitted.

In this second embodiment, the internal-combustion engine 10 is not equipped with the port injection valve 39P, but is equipped only with the cylinder injection valve 39C. For this reason, the above-mentioned cylinder injection quantity Fid is changed so that the cylinder injection rate R (assignment rate R) is set as "1", namely, it is determined by multiplying the basic fuel injection quantity Fbase by the subfeedback correction.

Figure 10:
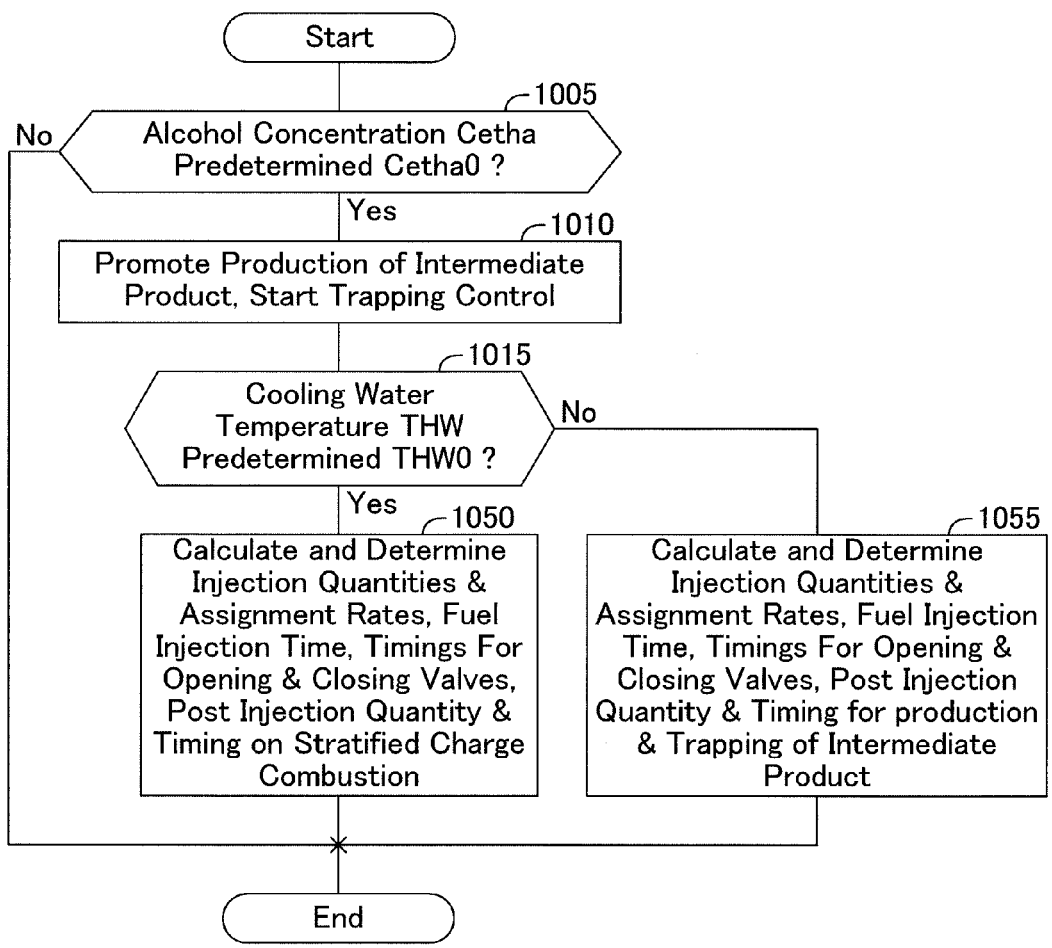
FIG. 10 is a flow chart showing the processing routine according to the second embodiment of the present invention, which the CPU shown in FIG. 1 performs.

Next, the actual operation in this second embodiment will be explained. FIG. 10 is a flow chart which shows an example of the flow of the processing routine which carries out "collecting and storing the intermediate product generated from alcohol-blended fuel" performed by CPU91 of the present device according to the second embodiment. In addition, the processing routine according to this second embodiment differs from that according to the first embodiment in that Step 1020 and Step 1025 of the processing routine according to the above-mentioned first embodiment are replaced with Step 1050 and Step 1055. Therefore, in the following explanation, Step 1050 and Step 1055 which were changed will be explained in detail.

In the processing routine in this second embodiment, when the output value THW of the water temperature sensor 77 acquired at Step 1015 is the predetermined value THW0 or more, it is judged that the engine 10 has already been in a steady operation state ("Yes" at Step 1015), and the engine 10 being already in a steady operation state is operated in accordance with a usual embodiment at Step 1050. On the other hand, when the output value THW of the acquired water temperature sensor 77 is the less than the predetermined value THW0, it is judged that the engine 10 is on low-temperature starting ("No" at Step 1015), and the engine 10 is operated so that the intermediate product may be promoted to be generated and may be trapped (collected and stored) at Step 1055.

At Step 1050, since the engine 10 is already in a steady operation state, in accordance with a usual embodiment, the fuel injection quantities and fuel injection time of the cylinder injection valve 39C injecting fuel, the timings for opening and closing the intake valve 32 and exhaust valve 35, and the injection quantity and timing of the post injection by the cylinder injection valve 39C are respectively calculated and determined, and the engine 10 is operated.

Concretely, as for the fuel injection quantity that the cylinder injection valve 39C inject into a cylinder when the engine 10 is in a steady operation state, in accordance with the air/fuel ratio feedback control, the cylinder injection quantity Fid is determined by multiplying the basic fuel injection quantity Fbase by the above-mentioned subfeedback correction. Moreover, the time when the cylinder injection valve 39C inject the cylinder injection quantity Fid of fuel when the engine 10 is in a steady operation state is determined to be in an admission stroke, in principle, based on the engine revolving speed NE and load condition (specifically, inhaled air mass flow rate Ga etc.) and, specifically, is determined so that the cylinder injection quantity Fid of fuel may be injected within a compression stroke. Thereby, in this second embodiment, stratified charge combustion is carried out by igniting fuel in a state before the injected fuel spreads widely in the combustion chamber 25, i.e., a state where comparatively dense air-fuel mixture gathers near the spark plug 37.

In addition, as for the timings for opening and closing the intake valve 32 and exhaust valve 35 and the valve lift of the intake valve 32, and the injection quantity and timing of the post injection by the cylinder injection valve 39C, they are identical to those determined at Step 1020 of the processing routine according to the above-mentioned first embodiment. Therefore, the explanation thereof will be omitted. And, at Step 1050, in accordance with a usual embodiment, the fuel injection quantity and fuel injection time when the cylinder injection valve 39C injects fuel into the cylinder, the timings for opening and closing the intake valve 32 and exhaust valve 35, and the injection quantity and timing of the post injection by the cylinder injection valve 39C are respectively calculated and determined, and the engine 10 is operated, and then the execution of the processing routine is ended at Step 1030.

At Step 1055, in order to start up the engine 10 at low temperature to be operated, the fuel injection quantities and fuel injection time of the cylinder injection valve 39C injecting fuel into a cylinder, the timings for opening and closing the intake valve 32 and exhaust valve 35, and the injection quantity and timing of the post injection by the cylinder injection valve 39C are respectively calculated and determined that the intermediate product may be promoted to be generated and may be trapped (collected and stored), and the engine 10 is operated.

Concretely, first, in order to promote the generation of the intermediate product, the fuel injection quantity and fuel injection time that the cylinder injection valve 39C injects fuel into a cylinder and the timings for opening and closing the intake valve 32 and exhaust valve 35 are determined based on the quantity of generation of the intermediate product (concretely, aldehyde) presumed based on the "generating conditions of the intermediate product in the internal-combustion engine in which alcohol-blended fuel is supplied" mentioned above. Namely, for example, in a situation where the gas temperature presumed based on the output value THW from the water temperature sensor 77 is low, it is a situation where the quantity of generation of the intermediate product presumed based on the above-mentioned generating conditions of the intermediate product is still small. For this reason, as schematically shown in FIG. 11, increase the cylinder injection quantity Fid is determined so that a stratified charge combustion may be carried out with a lean air/fuel ratio.

Moreover, the timings for opening and closing the exhaust valve 35 are determined so that the residence time which remains in a cylinder will suit the above-mentioned generating conditions of the intermediate product. Furthermore, as the injection quantity and time of the post injection by the cylinder injection valve 39C, as mentioned above, only post injection quantity Fid_p is post-injected in an exhaust stroke. In addition, as for the timing of this post injection, specifically, it is preferable that fuel is injected in the last period of an exhaust stroke during which aldehyde which is the generated intermediate product exists near the intake valve 32. Thereby, aldehyde which is an intermediate product can be generated efficiently.

Figure 11:
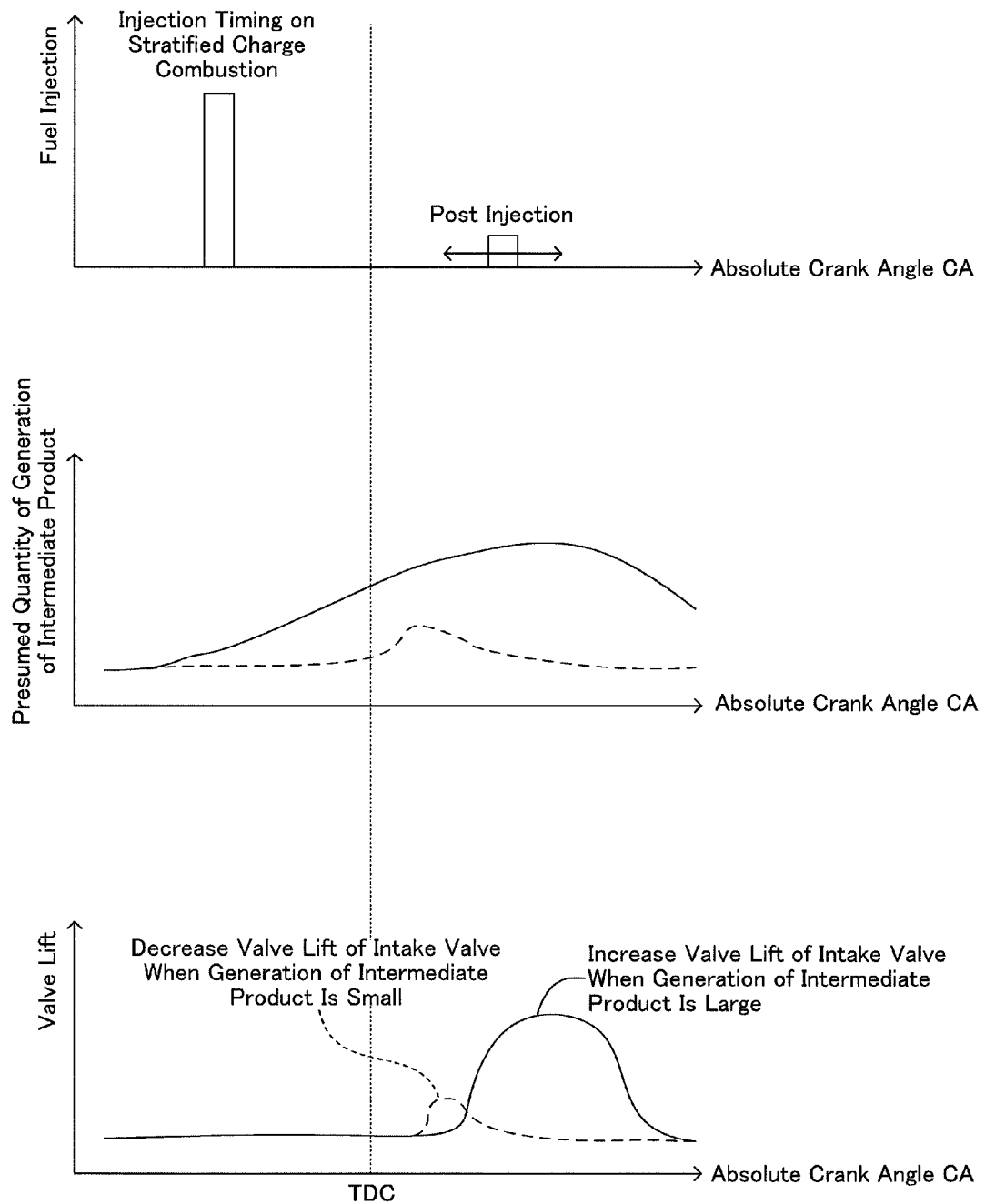
FIG. 11 is a figure for explaining the magnitude of valve lift of an intake valve according to the second embodiment of the present invention, which is changed in accordance with the quantity of generation of an intermediate product.

Next, in order to collect and store the aldehyde which is the generated intermediate product in an intake passage, the timing for opening and closing the intake valve 32 and the valve lift thereof, they are identical to the determination at Step 1025 of the processing routine according to the above-mentioned first embodiment, as shown in FIG. 11. Therefore, the explanation thereof will be omitted. And, at Step 1055, the fuel injection quantity and fuel injection time when the cylinder injection valve 39C injects fuel in to a cylinder, the timings for opening and closing the intake valve 32 and exhaust valve 35, and the injection quantity and timing of the post injection by the cylinder injection valve 39C are respectively calculated and determined so that the intermediate product may be promoted to be generated and may be trapped, and the engine 10 is operated, and then the execution of the processing routine is ended at Step 1030.

As mentioned above, also in accordance with the second embodiment (specifically, the processing shown in FIG. 10) according to the present invention, similarly to the above-mentioned first embodiment, when the alcohol concentration Cetha of the alcohol-blended fuel supplied to the engine 10 is large and it is judged that the cooling water temperature THW is low ("Yes" at Step 1005 and "No" at Step 1015), operation control of the engine 10 is performed so that the generation of the intermediate product by post injection may be promoted and the intermediate product may be trapped (collected and stored) in an exhaust stroke (Step 1055). Therefore, the intermediate product (specifically, aldehyde) which is an intermediate oxide of the alcohol contained in alcohol-blended fuel and has good oxidization (combustion) characteristics can be consumed and, especially, the low-temperature start-up performance of the engine 10 can be largely improved. Moreover, since the low-temperature start-up performance of the engine 10 is improved by consuming the intermediate product (specifically, aldehyde), the intermediate product (specifically, aldehyde) which is a toxic substance can be prevented from being emitted out of a vehicle.

In addition, the present invention is not limited to the above-mentioned first embodiment and the second embodiment, and can adopt various modifications within the scope of the present invention. For example, the above-mentioned first embodiment and the second embodiment were carried out so that the generated intermediate product (specifically, aldehyde) was trapped (collected) in an intake passage and stored by opening the intake valve 32 in an exhaust stroke and changing the valve lift according to the presumed quantity of generation of the intermediate product (FIG. 9, FIG. 11).

In this case, it is also possible to carry out so that burnt gas containing the intermediate product generated in a cylinder may go into an intake passage more easily and certainly. Specifically, the pressure in a cylinder can be made always larger than the pressure in an intake passage by closing the throttle valve 43 through the actuator 43a to create negative pressure inside the intake passage. Thereby, for example, even other than in an exhaust stroke, it becomes possible to trap (collect) burnt gas containing the intermediate product generated in the cylinder in the intake passage and to store the same. Moreover, it is also possible to dispose what is called a tandem control valve (TCV) and/or a swirl control valve (SCV), or to carry out one-valve-closing control of an intake valve and exhaust valve, etc. so that a tandem flow and/or a swirl flow may occur near the combustion chamber 25 in the cylinder. Thereby, the burnt gas which contains the intermediate product generated in the cylinder comes to go into the intake passage certainly, and it becomes possible to store the same in the intake passage.

The invention claimed is:

1. A control device of an internal-combustion engine applied to an internal-combustion engine including means for directly injecting fuel containing at least gasoline into a combustion chamber of the internal-combustion engine and means for continuously changing the timings of opening and closing and the valve opening position of an intake valve disposed in an intake passage through which the air is inhaled into said combustion chamber, said control device comprising:
a controller, which is configured to:
keep said intake valve opened during a predetermined period after having said direct injection means inject said fuel in order to raise a temperature of a catalyst disposed in an exhaust passage through which exhaust gas discharged from said combustion chamber passes, and
presume the quantity of an intermediate product produced from unburnt fuel in said fuel supplied into said combustion chamber,
keep said intake valve opened at a large valve opening position during said predetermined period when the presumed quantity of said intermediate product is large, and
keep said intake valve opened at a small valve opening position during said predetermined period when the presumed quantity of said intermediate product is small.

2. A control device of an internal-combustion engine according to claim 1, wherein,
said intermediate product generated from said unburnt fuel is collected and stored in said intake passage, and is inhaled into said combustion chamber in the next admission stroke in said internal-combustion engine.

3. A control device of an internal-combustion engine according to claim 1, wherein,
said intermediate product is produced with advance of oxidation reaction of said unburnt fuel.

4. A control device of an internal-combustion engine according to claim 1, wherein,
said predetermined period is, at least, a period set up within an exhaust stroke in said internal-combustion engine.

5. A control device of an internal-combustion engine according to claim 1, wherein,
said internal-combustion engine further comprises a means for injecting said fuel into the intake passage upper stream than said intake valve of said internal-combustion engine, and
said controller is further configured to:
determine the cylinder injection rate which is a rate of a cylinder injection quantity which is a quantity of said fuel injected from said port injection means to a sum of a port injection quantity which is a quantity of said fuel injected from said port injection means and said cylinder injection quantity, and
inject the fuel, based on said cylinder injection rate determined by said cylinder injection rate determination.

6. A control device of an internal-combustion engine according to claim 1, wherein,
the quantity of generation of said intermediate product is based on at least one of a residence time in which said fuel supplied in said combustion chamber remains in an unburnt state, a temperature when said fuel supplied in said combustion chamber is in an unburnt state, and an air/fuel ratio of an air-fuel mixture consisting of said fuel and air in said combustion chamber.

7. A control device of an internal-combustion engine according to claim 1, further comprising:
for detecting alcohol concentration which is concentration of alcohol component contained in said fuel supplied to the combustion chamber of said internal-combustion engine; and
for detecting an operational status temperature of said internal-combustion engine,
wherein,
said controller is configured to control said variable valve actuation means keep said intake valve opened during a predetermined period when the concentration of alcohol component contained in said fuel detected by said alcohol concentration detection means is a predetermined concentration or more and the operational status temperature of said internal-combustion engine detected by said temperature detection means is less than a predetermined temperature.

8. A control device of an internal-combustion engine that includes a cylinder injection valve that directly injects fuel containing at least gasoline into a combustion chamber of the internal-combustion engine and an actuator that opens and closes an intake valve disposed in an intake passage through which the air is inhaled into said combustion chamber, said control device comprising:
a controller, including a processor configured to:
control a cylinder injection valve to directly inject fuel containing at least gasoline into a combustion chamber of the internal combustion engine;
control an actuator to open and close an intake valve disposed in an intake passage through which air is inhaled into said combustion chamber;
keep said intake valve opened during a predetermined period after controlling said cylinder injection valve to inject the fuel in order to raise a temperature of a catalyst disposed in an exhaust passage through which exhaust gas discharged from said combustion chamber passes;

presume a quantity of an intermediate product produced from unburnt fuel in the fuel supplied into said combustion chamber;

keep said intake valve opened at a valve opening position during said predetermined period based on the presumed quantity of said intermediate product, wherein a magnitude of the valve opening position is changed in accordance with the presumed quantity of the intermediate product.

\* \* \* \* \*